US012479121B2

United States Patent

(12) United States Patent
Nadachi et al.

(10) Patent No.: US 12,479,121 B2
(45) Date of Patent: Nov. 25, 2025

(54) CUTTING WASTE REMOVING DEVICE, SLOTTER DEVICE, AND BOX MAKING MACHINE

(71) Applicant: MITSUBISHI HEAVY INDUSTRIES MACHINERY SYSTEMS, LTD., Hyogo (JP)

(72) Inventors: Mitsuhiro Nadachi, Hyogo (JP); Osamu Hatano, Hyogo (JP)

(73) Assignee: MITSUBISHI HEAVY INDUSTRIES MACHINERY SYSTEMS, LTD., Kobe (JP)

( * ) Notice: Subject to any disclaimer, the term of this patent is extended or adjusted under 35 U.S.C. 154(b) by 221 days.

(21) Appl. No.: 18/278,638

(22) PCT Filed: Feb. 21, 2022

(86) PCT No.: PCT/JP2022/006915

§ 371 (c)(1),
(2) Date: Aug. 24, 2023

(87) PCT Pub. No.: WO2022/181533

PCT Pub. Date: Sep. 1, 2022

(65) Prior Publication Data

US 2024/0293949 A1 Sep. 5, 2024

(30) Foreign Application Priority Data

Feb. 25, 2021 (JP) ................................ 2021-028164

(51) Int. Cl.
*B26D 7/18* (2006.01)
*B31B 50/22* (2017.01)
*B31B 50/62* (2017.01)

(52) U.S. Cl.
CPC ........... *B26D 7/1854* (2013.01); *B31B 50/22* (2017.08); *B31B 50/624* (2017.08)

(58) Field of Classification Search
CPC ............................ B26D 7/1854; B31B 50/22
See application file for complete search history.

(56) References Cited

U.S. PATENT DOCUMENTS 475,280 A * 5/1892 Jordan ................ B26D 7/1854 83/124
2,757,585 A 8/1956 Wenzel
(Continued)

FOREIGN PATENT DOCUMENTS

CN 109789599 A 5/2019
JP S55142300 U 10/1980
(Continued)

OTHER PUBLICATIONS

Extended European Search Report of European Application No. 22759569.1 dated Jul. 19, 2024, 8 pp.
(Continued)

*Primary Examiner* — Sean M Michalski
(74) *Attorney, Agent, or Firm* — HAUPTMAN HAM, LLP

(57) ABSTRACT

A cutting waste removing device, installed in a box making machine for manufacturing corrugated cardboard boxes from a corrugated cardboard sheet, to remove cutting waste generated in a cutting process performed by a paper discharging unit of the box making machine, is provided with an air blowing device which is disposed along a travel region in a device width direction, through which cut processed portions of the corrugated cardboard sheet and the cutting waste travel, and which ejects air toward the cutting waste in such a way as to include a vertically downward directional component in a prescribed ejection mode, and a control device for performing intermittent on-off control of the operation of the air blowing device, wherein the control device controls the air blowing device to be on only at a
(Continued)

timing at which the cutting waste passes through an air ejection region of the air blowing device.

20 Claims, 12 Drawing Sheets

(56) References Cited

U.S. PATENT DOCUMENTS

| | | | | |
|---|---|---|---|---|
| 4,473,431 | A * | 9/1984 | Achelpohl | B65H 33/12 271/197 |
| 8,414,464 | B2 * | 4/2013 | Grischenko | B31B 70/00 493/902 |
| 9,844,889 | B1 * | 12/2017 | Budek | B26F 1/3846 |
| 2005/0192171 | A1 * | 9/2005 | Grischenko | B31B 50/592 493/178 |
| 2011/0015051 | A1 * | 1/2011 | Grischenko | B31B 50/592 493/52 |
| 2014/0318338 | A1 | 10/2014 | Horii et al. | |
| 2018/0236741 | A1 * | 8/2018 | Hargett | B31B 70/146 |
| 2018/0333885 | A1 * | 11/2018 | Budek | B26F 1/384 |
| 2020/0368931 | A1 | 11/2020 | Niimi et al. | |
| 2021/0309007 | A1 | 10/2021 | Deppisch et al. | |

FOREIGN PATENT DOCUMENTS

| | | | |
|---|---|---|---|
| JP | H05309606 | A | 11/1993 |
| JP | H07132496 | A | 5/1995 |
| JP | 4544883 | B2 | 9/2010 |
| JP | 2010214475 | A | 9/2010 |
| JP | 5773511 | B2 | 9/2015 |
| JP | 2018108657 | A | 7/2018 |
| JP | 6669925 | B1 | 3/2020 |
| WO | 2009119194 | A1 | 10/2009 |
| WO | 2020160947 | A1 | 8/2020 |

OTHER PUBLICATIONS

Japanese Office Action dated Feb. 6, 2024 of JP Application No. 2021-028164.
European Patent Office Action for European Patent Application No. 22 759 569.1 dated Apr. 4, 2025; 6 pp.
International Search Report for PCT/JP2022/006915 dated May 17, 2022 (5 pages).
Written Opinion for PCT/JP2022/006915 dated Aug. 29, 2023 (12 pages).
Chinese Patent Office, The First Office Action for Chinese Patent Application No. 202280015030.2 dated Jun. 12, 2025; 16 pp.

* cited by examiner

CUTTING WASTE REMOVING DEVICE, SLOTTER DEVICE, AND BOX MAKING MACHINE

RELATED APPLICATIONS

The present application is a National of Phase of International Application Number PCT/JP2022/006915 filed Feb. 21, 2022 and claims priority to Japanese Application Number 2021-028164 filed Feb. 25, 2021.

TECHNICAL FIELD

The present invention relates to a cutting waste removing device, a slotter device including the cutting waste removing device, and a box making machine.

BACKGROUND ART

A box making machine that manufactures a corrugated cardboard box from a corrugated cardboard sheet is configured by using a feeding section, a printing section, a slotter creaser section, a die cutting section, a folding section (folder gluer), and a counter-ejector section. In the slotter creaser section, a creasing line to be a fold line is formed on the printed corrugated cardboard sheet by a creaser device, a groove forming a flap is processed in an intermediate portion of the corrugated cardboard sheet in a device width direction and a gluing flap strip for joining is processed in one end portion in the device width direction by the slotter device, and an unnecessary edge portion of the other end portion in the device width direction is cut and removed.

In a case in which the groove or the cut strip is processed in the slotter creaser section to remove the edge portion, a cutting waste is generated. It is required to reliably separate and remove such a cutting waste so as not to be mixed in a product.

PTL 1 discloses a technique for reliably separating and removing a slit waste by blowing air from above to the slit waste generated by cutting an unnecessary edge portion among such cutting wastes to guide the slit waste to a slit waste guide placed below.

CITATION LIST

Patent Literature

[PTL 1] Japanese Patent No. 4544883

SUMMARY OF INVENTION

Technical Problem

By the way, in order to separate and remove the cutting waste generated in the slotter creaser section, the following various techniques can be considered.

(1) An air blower is arranged at an outlet of the slotter creaser section, the air blower is always turned on to blow the air to the cutting waste, and the cutting waste is removed by being blown off to the outer downward side immediately after cutting.

(2) By improving a shape of an upper knife provided in the slotter device to make it easier to hold the cutting waste by a lower knife, the removal is promoted.

(3) The air blower is arranged on an inclination plate, which is arranged on a lower portion of the slotter creaser section and guides the cutting waste to a discard space, and the air blower is always turned on to prevent the cutting waste from being caught in a gap narrowed by the inclination plate and a roll, a cover, or the like of the die cutting section.

(4) The air blower is arranged at an inlet of the die cutting section, and the air blower is always turned on during operation to blow off the cutting waste, which has flowed, to the outside and remove the cutting waste.

(5) The air blower is arranged at an inlet of the folding section, and the air blower is always turned on during operation to blow off the cutting waste, which has flowed, to the outside and remove the cutting waste.

(6) A fixing brush or a rotation brush is arranged above and below a corrugated cardboard sheet transfer passage upstream of a gluing device arranged on the folding section to remove the cutting waste, which has flowed.

However, even in a case in which these techniques are implemented, the following problems occur.

Among the cutting wastes, regarding a gluing flap waste generated by processing the gluing flap strip, in a case in which the air is blown to the gluing flap waste, the air is also blown to a gluing flap portion, the gluing flap portion swings and interferes with the peripheral parts of the device. Therefore, a defective product may be generated in which scratches or wrinkles appear and the gluing in the next step cannot be performed normally, and thus the air cannot be blown strongly.

In addition, among the cutting wastes, also for a slot waste generated by processing the groove or the slit waste generated by cutting the unnecessary edge portion, the air is also blown to a front end portion in a transfer direction of the corrugated cardboard sheet, and the corrugated cardboard sheet swings, and thus there is a risk that the interference with the peripheral parts of the device occurs to cause the deformation of the corrugated cardboard sheet or the occurrence of bending or delay of the transfer. Therefore, the air cannot be blown strongly.

Therefore, it is not possible to prevent the cutting waste from being mixed in the product simply by arranging the air blower at the outlet of the slotter creaser section according to (1) described above, and it is required to use many of the techniques of (2) to (6) described above in combination.

As a result, the device for separating and removing the cutting waste has a large scale, and the cost is increased.

In addition, even in a case in which all of the techniques of (1) to (6) described above are used in combination, the cutting waste may be mixed in the product.

In particular, in a case of a corrugated cardboard box having over flaps on both edges of the gluing flap portion (front and rear edges in a traveling direction of the corrugated cardboard sheet), in a case in which the air is blown to the gluing flap waste, the air is also blown to the over flaps, the gluing flap portion swings, and the over flaps swing more than the swing of the gluing flap portion. As a result, the risk of the interference with the peripheral parts of the device is more obvious, or the defective product is likely to be generated in which the over flaps are glued while being rolled up. Therefore, it is required to further suppress the strength of the air to be blown, and the frequency of the gluing flap waste being mixed in the product may be higher.

The present invention has been made to solve the problems described above, and an object thereof is to provide a cutting waste removing device that can reliably separate and remove a cutting waste generated in a case of manufacturing a corrugated cardboard box from a corrugated cardboard sheet while suppressing an increase in the complexity of a device or an increase in cost, a slotter device including the cutting waste removing device, and a box making machine.

Solution to Problem

An aspect of the present invention relates to a cutting waste removing device that is provided in a box making machine which manufactures a corrugated cardboard box from a corrugated cardboard sheet, and that removes a cutting waste generated in cutting processing by a slotter creaser section of the box making machine, the cutting waste removing device including an air blowing device that is arranged along a traveling area in a device width direction in which a cutting processed portion of the corrugated cardboard sheet and the cutting waste travel, and that injects air toward the cutting waste in a predetermined injection mode such that a directional component to a vertically downward side is included, and a control device that performs intermittent on/off control of an operation of the air blowing device, in which the control device controls the air blowing device to be turned on only at a timing at which the cutting waste passes through an air injection region of the air blowing device.

Another aspect of the present invention relates to a slotter device that is provided in a box making machine which manufactures a corrugated cardboard box from a corrugated cardboard sheet, the slotter device including the cutting waste removing device described above on a downstream side of a slotter knife of the slotter device.

Still another aspect of the present invention relates to a box making machine that manufactures a corrugated cardboard box from a corrugated cardboard sheet, the box making machine including the cutting waste removing device described above.

Advantageous Effects of Invention

According to the present invention, since the air blowing device is controlled to be turned on only at the timing at which the cutting waste passes through the air injection region of the air blowing device, the air can be strongly blown only to the cutting waste, and the cutting waste can be reliably removed while suppressing the blowing of the air to the cutting processed portion and suppressing the swing of the cutting processed portion. In addition, the cutting waste removing device other than the air blowing device is also unnecessary, a device configuration is simple, and thus it is possible to suppress the increase in the complexity of the device or the increase in the cost. Further, since the air injection is performed intermittently, it is possible to suppress an amount of the air consumption.

BRIEF DESCRIPTION OF DRAWINGS

FIG. 1A is a side view showing a main section thereof, and FIG. 1B is a plan view of a corrugated cardboard sheet showing an air blowing method.

DESCRIPTION OF EMBODIMENTS

Hereinafter, embodiments of the present invention will be described with reference to the drawings.

It should be noted that each embodiment described below is merely an example, and there is no intention to exclude various modifications or application of techniques that are not explicitly described in the following embodiments. Each configuration of the embodiments described below can be variously modified and implemented without departing from the gist thereof, and can be selected or appropriately combined as required.

[Overall Configuration of Box Making Machine]

A slotter device according to each embodiment is provided in a box making machine. First, the box making machine including the slotter device according to each embodiment will be described with reference to FIG. 2. It should be noted that, in the following description, a transfer direction TD of a corrugated cardboard sheet (hereinafter, also simply referred to as "sheet") 10 will be referred to as front, an opposite direction thereto will be referred to as rear, a gravity direction (vertically downward side) will be referred to as down, and an opposite direction (vertically upward direction) thereto will be referred to as up. In addition, a device width direction of the box making machine (direction perpendicular to the transfer direction TD and a vertical direction) will be referred to as a right-and-left direction.

Figure 2:
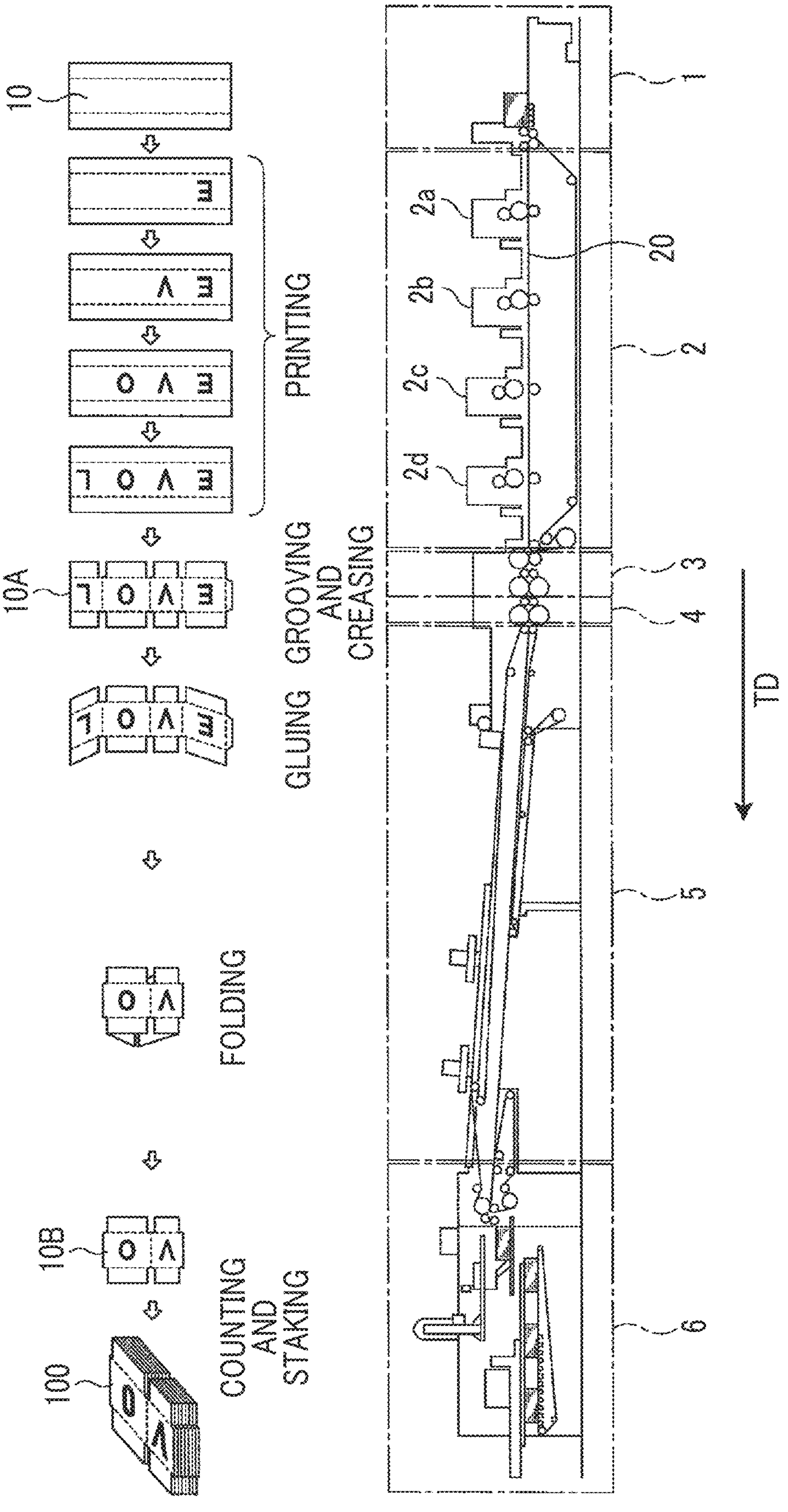
FIG. 2 is a view showing an overall configuration of a corrugated cardboard box making machine including a slotter device according to each embodiment.

As shown in FIG. 2, the box making machine includes a feeding section 1, a printing section 2, a slotter creaser section 3, a die cutting section 4, a folding section 5, and a counter-ejector section 6, which are arranged in order from an upstream side in the transfer direction TD of the sheet. It should be noted that, in FIG. 2, a process of processing a plate-shaped sheet 10 into a sheet for box making 10A and a corrugated cardboard box 10B in a folded state is shown above a device configuration, separately from the device configuration. The sheet is transferred at a certain constant transfer speed along a linear transfer passage from the feeding section 1 to the counter-ejector section 6.

A large number of sheets 10 are transferred into the feeding section 1 in a stacked state, and the sheets 10 are supplied to the printing section 2 one by one.

The printing section 2 includes printing units 2*a* to 2*d* having a predetermined number of colors (herein, four colors), and the printing section 2 performs printing, in order, with respective colors of inks on the sheets 10 transferred one by one by a transfer conveyor 20.

In the slotter creaser section 3 and the die cutting section 4, the sheet 10 printed by the printing section 2 is subjected to grooving, gluing flap portion processing, vertical creasing line processing (creasing), perforating, punching processing, or the like. That is, in the slotter creaser section 3, the grooving or the gluing flap portion processing is performed on the sheet 10 by a slotter device to be described below and the creasing is performed by a creaser device, in the die cutting section 4, the perforating and the punching processing of a hand hole, an air hole, and the like is performed on the sheet 10, and as a result, the sheet for box making 10A is obtained.

It should be noted that, in the die cutting section 4, the grooving and the creasing for making a box having a special shape are also performed in some cases. Therefore, both the slotter creaser section 3 and the die cutting section 4 have a function of performing the grooving and the creasing.

Then, in the folding section 5, gluing with glue is performed on a gluing flap at one end of the sheet for box making 10A, on which the grooving, gluing flap portion processing, the creasing, and the like are performed, in the right-and-left direction, and folding processing is performed such that both right and left end portions of the sheet for box making 10A overlap each other on a back side (lower side), to obtain the corrugated cardboard box 10B in a folded state in which both the right and left end portions are bonded with the glue. In the counter-ejector section 6, the corrugated cardboard boxes 10B in a folded state are counted stacked, are sorted into a predetermined number of batches 100, and are discharged.

Hereinafter, each of first to third embodiments of the slotter device including the cutting waste removing device will be described.

A single slotter will be described as an example in the first embodiment, a double slotter will be described as an example in the second embodiment, and a dual slotter will be described as an example in the third embodiment.

First Embodiment

[Slotter Device]

First, the slotter device including the cutting waste removing device according to the first embodiment will be described. It should be noted that, in the first embodiment, the slotter device 30 as the single slotter will be described.

Figure 1A:
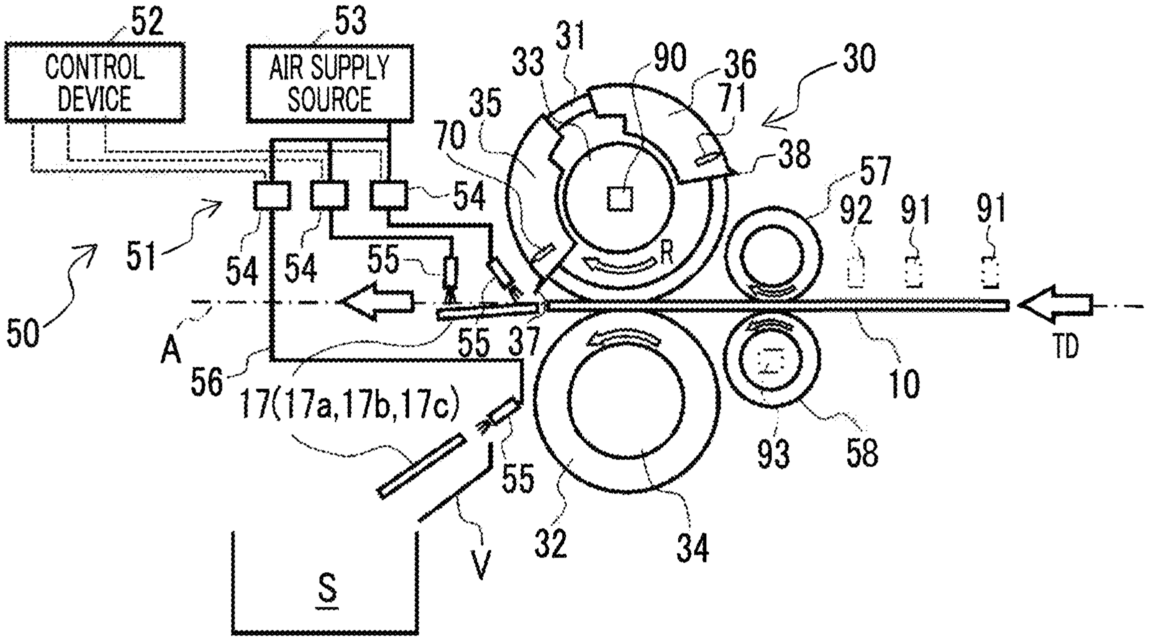
FIG. 1A and FIG. 1B are views for describing a cutting waste removing device according to a first embodiment.
Figure 5:
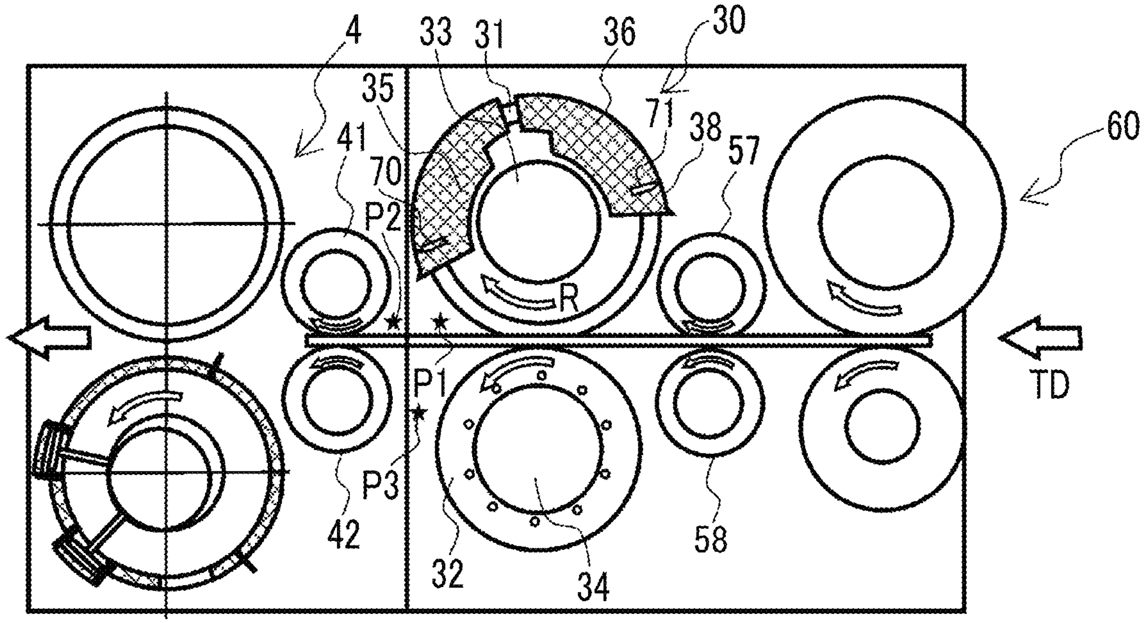
FIG. 5 is a schematic side view showing the slotter device according to the first embodiment.

As shown in FIG. 1A and FIG. 5, transfer rollers 57 and 58 are provided upstream of the slotter device 30. The transfer rollers 57 and 58 transfer the sheet 10, which is subjected to the creasing by a creaser device 60, at a constant transfer speed along the transfer direction TD, and supply the sheet 10 to the slotter device 30.

Figure 1B:
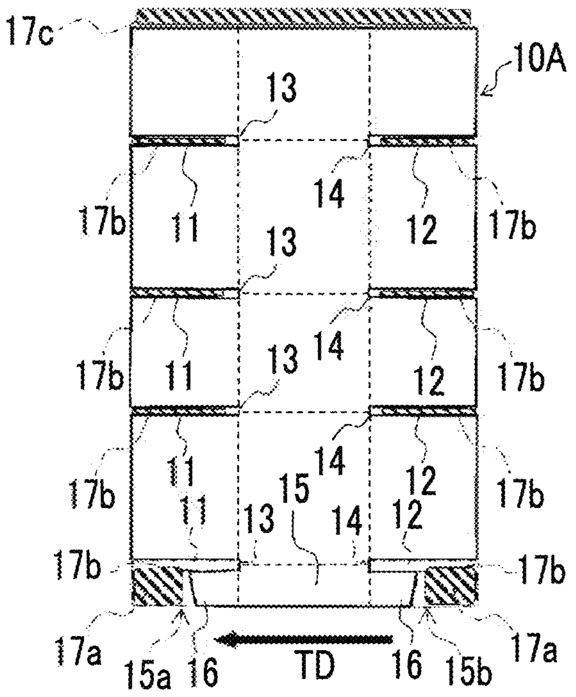

As shown in FIG. 1B, in the sheet for box making 10A, a gluing flap portion 15 and slots 11 and 12 are processed in the sheet 10. In addition, the sheet for box making 10A according to the present embodiment includes over flaps 16 at both edges (front and rear ends in the transfer direction TD) of the gluing flap portion 15.

[Slotter Device]

Figure 6:
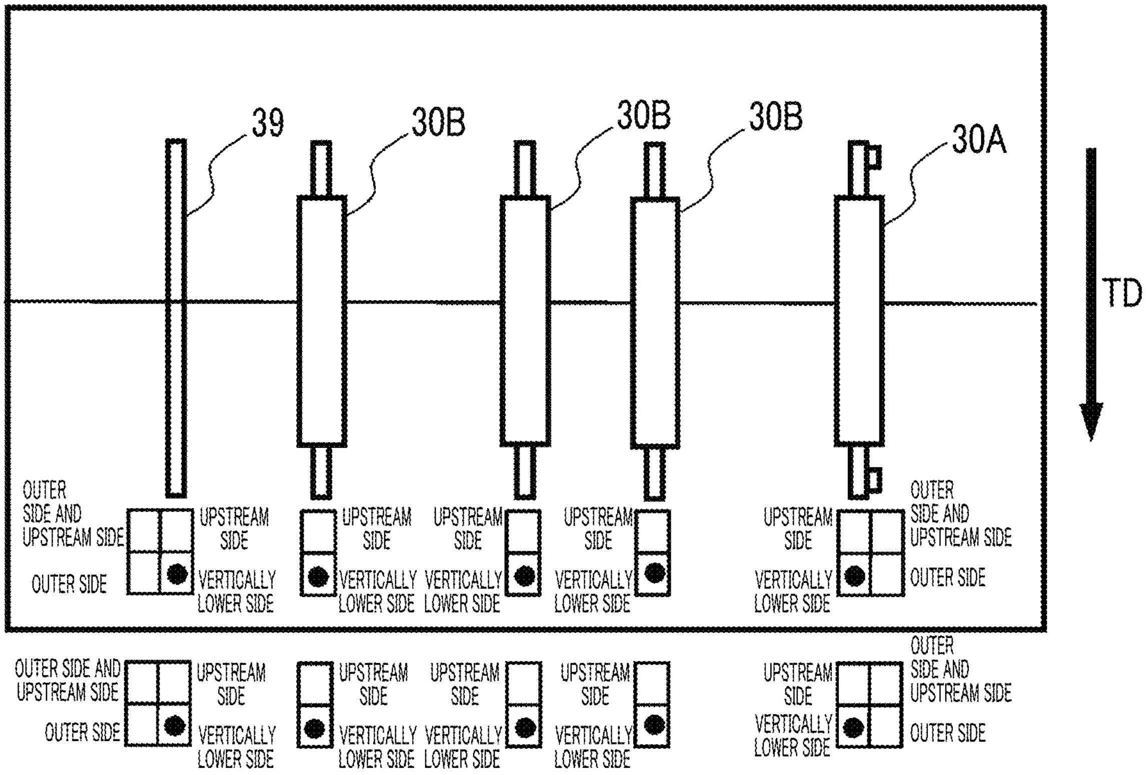
FIG. 6 is a schematic plan view of the slotter device of FIG. 5, and also shows an air blowing direction of an air blow nozzle arranged in each portion.

As shown in FIG. 6, the slotter device 30 includes a first slotter device 30A that cuts a removal portion 15*a* on a front side of the gluing flap portion 15 in the transfer direction TD and cuts a removal portion 15*b* on a rear side of the gluing flap portion 15 in the transfer direction TD at one edge portion of the sheet 10 in order to form the gluing flap portion 15 (including the over flap 16), and three second slotter devices 30B that cut the slot 11 (see FIG. 1B) on the front side in the transfer direction TD and the slot 12 (see FIG. 1B) on the rear side in the transfer direction TD. In addition, the slotter device 30 is provided with a slitter device 39 that cuts the edge portion of the sheet 10 at the other edge portion of the sheet 10.

It should be noted that, in the following description, in a case in which the distinction is not required, the first slotter device 30A, the second slotter device 30B, and the slitter device 39 will be referred to as the slotter device 30.

As shown in FIG. 1A and FIG. 1B, each of the slotter devices 30A and 30B has an upper slotter head 31 and a lower slotter head 32 that are arranged to vertically face each other with the transfer passage of the sheet 10 interposed therebetween.

The upper slotter head 31 is supported by an upper rotating shaft 33, and the upper rotating shaft 33 is connected to an upper motor (not shown). In addition, the lower slotter head 32 is supported by a lower rotating shaft 34, and the lower rotating shaft 34 is connected to a lower motor (not shown). The rotational driving of the upper motor and the lower motor is controlled by a motor control device (not shown).

It should be noted that, as the motor control device, a computer is used in the same manner as a control device 52 to be described below, and the motor control device includes a central processing device (CPU) having functions of a calculation unit and a processing unit, a storage unit (storage device) including a main storage device including a ROM and a RAM, and an auxiliary storage device including an HDD or an SSD, an input unit including an input interface, an output unit including an output interface, and a bus that connects these units. Information for controlling an operation of the motor is input to the input unit, and command information processed by the CPU based on this information is output from the output unit to a control system of the motor to control the motor.

As shown in FIG. 1A and FIG. 5, a first slotter knife 35 and a second slotter knife 36 are attached to the upper slotter head 31 at intervals in a circumferential direction.

The first slotter knife 35 is used to form the slot 11 (see FIG. 1B) on the front side of the gluing flap portion 15 in the transfer direction TD, and the other second slotter knife 36 is used to form the slot 12 (see FIG. 1B) on the rear side in the transfer direction TD. In addition, although details are not shown, the lower slotter head 32 includes a receiving knife including two knives attached to correspond to the first slotter knife 35 and the second slotter knife 36 at intervals.

Protrusion portions 37 and 38 protruding from a knife edge are provided, respectively, at a rear end portion of the first slotter knife 35 in a rotation direction R and at a front end portion of the second slotter knife 36 in the rotation direction R. By piercing the sheet 10, the protrusion portions 37 and 38 cut end portions 13 and 14 of the slots 11 and 12 (see FIG. 1B), respectively. In addition, gluing flap knives 70 and 71 are provided on side surfaces of the first slotter knife 35 and the second slotter knife 36. The gluing flap knives 70 and 71 cut an end portion of the gluing flap portion 15. It should be noted that the gluing flap knives 70 and 71 can be moved along an arc direction of the first slotter knife 35 and the second slotter knife 36 by a mechanism (not shown).

In addition, the first slotter knife 35 and the second slotter knife 36 are attached such that a mutual interval therebetween in the circumferential direction can be adjusted. A mutual interval between the rear end portion of the first slotter knife 35 and the front end portion of the second slotter knife 36 is set depending on a box depth determined as specifications of the corrugated cardboard box to be manufactured.

[Cutting Waste Removing Device]

A cutting waste removing device 50 according to the present embodiment is a device for removing a cutting waste generated by cutting using the slotter device 30.

Figure 3:
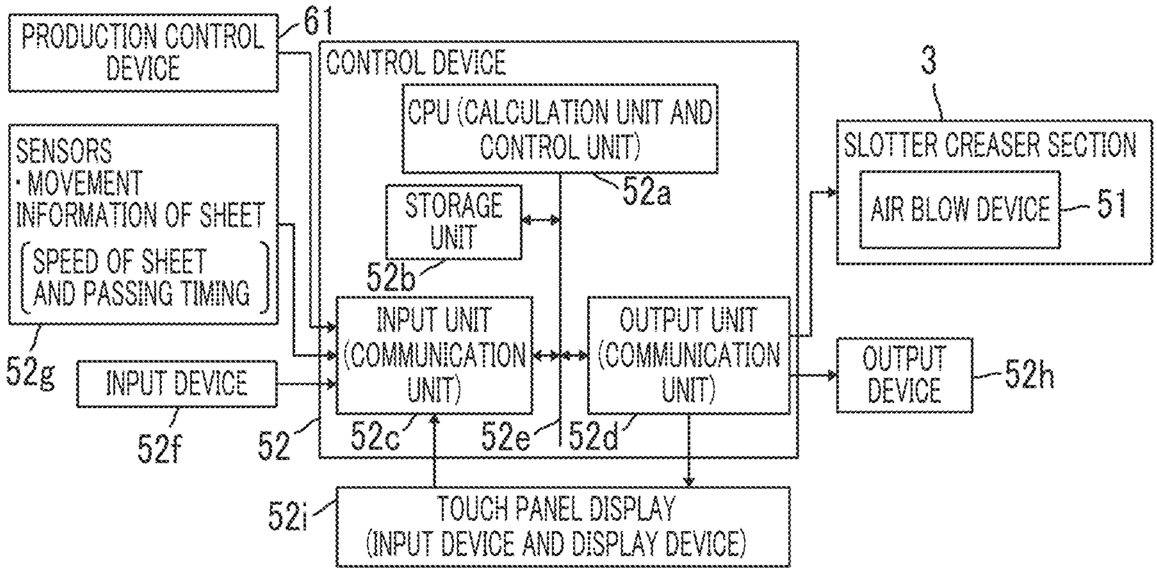
FIG. 3 is a block diagram showing a configuration of a control system of the cutting waste removing device according to each embodiment.

As shown in FIG. 3, the cutting waste removing device 50 includes an air blow device (air blowing device) 51 and the control device 52 that performs intermittent on/off control of an operation of the air blow device 51.

As the control device 52, a computer is used, and the control device 52 includes a central processing device (CPU) 52*a* having functions of a calculation unit and a processing unit, a storage unit (storage device) 52*b* including a main storage device including a ROM and a RAM, and an auxiliary storage device including an HDD or an SSD, an input unit 52*c* including an input interface, an output unit 52*d* including an output interface, and a bus 52*e* that connects these units. It should be noted that the input unit 52*c* and the output unit 52*d* also have a function as a communication unit that communicates with an external device.

An input device 52*f*, such as a button, a dial, a keyboard, or a mouse, on which an operator performs an input operation, a production control device 61, sensors 52*g*, and the like are connected to the input unit 52*c* via the communication unit, and input information input from the input device 52*f*, information from the production control device 61, or detection information detected by the sensors 52*g* is taken into the control device 52 through the input unit 52*c*. The information from the production control device 61 includes order information of the corrugated cardboard box 1B, and the detection information from the sensors 52*g* includes sheet movement information related to the movement (speed or position) of the sheet 10.

It should be noted that, as the production control device 61, a computer is used in the same manner as the control device 52, and the production control device 61 includes a central processing device (CPU) having functions of a calculation unit and a processing unit, a storage unit (storage device) including a main storage device including a ROM and a RAM, and an auxiliary storage device including an HDD or an SSD, an input unit including an input interface, an output unit including an output interface, and a bus that connects these units.

An output device 52*h*, such as a display or a printer, and a control system of the slotter creaser section 3 or the like to be controlled are connected to the output unit 52*d* via the communication unit, and output information or control command information processed by the CPU 52*a* is output to the output device 52*h* or the control system of the slotter creaser section 3 through the output unit 52*d*. The control system of the slotter creaser section 3 includes a control element of the air blow device 51 to be described below, and the control element of the air blow device 51 is controlled by the control command information output from the output unit 52*d*.

In the present embodiment, a touch panel display 52*i* that functions as an input device and an output device (display device) is connected to the input unit 52*c* and the output unit 52*d*, and the input operation of the input information or the displaying of the output information can be performed through the touch panel display 52*i*. Here, the touch panel display 52*i* is provided side by side with another input device 52*f* or output device 52*h*, but the input device or the output device may be configured only with the touch panel display 52*i*.

The air blow device 51 is arranged along a traveling area in the device width direction in which a cutting processed portion (specifically, a cutting processed portion that forms the gluing flap portion 15 or a cutting processed portion that forms the slots 11 and 12) of the sheet 10 and a cutting waste 17 (specifically, a gluing flap waste 17*a*, a slot waste 17*b*, or a slit waste 17*c*) generated by the cutting processing travel, and injects the air toward the cutting waste 17 in a predetermined injection mode.

In this case, as the injection mode, the control device 52 controls the air blow device 51 to be turned on (air injection) only at a timing at which the cutting waste 17 passes through an air injection region of the air blow device 51. It should be noted that the injection mode includes various modes, such as whether the injection is continuous injection or intermittent injection, whether the injection is pulse-like or not, how to set a blowing direction, and how the air is blown, in addition to the injection timing applied to the air injection, the injection strength, the time length of the injection.

The air blow device 51 includes an air supply source 53, a flow rate adjusting device 54, an air blow nozzle 55, and an air pipe 56 that connects the air supply source 53, the flow rate adjusting device 54, and the air blow nozzle 55 in a communicable manner.

Figure 4:
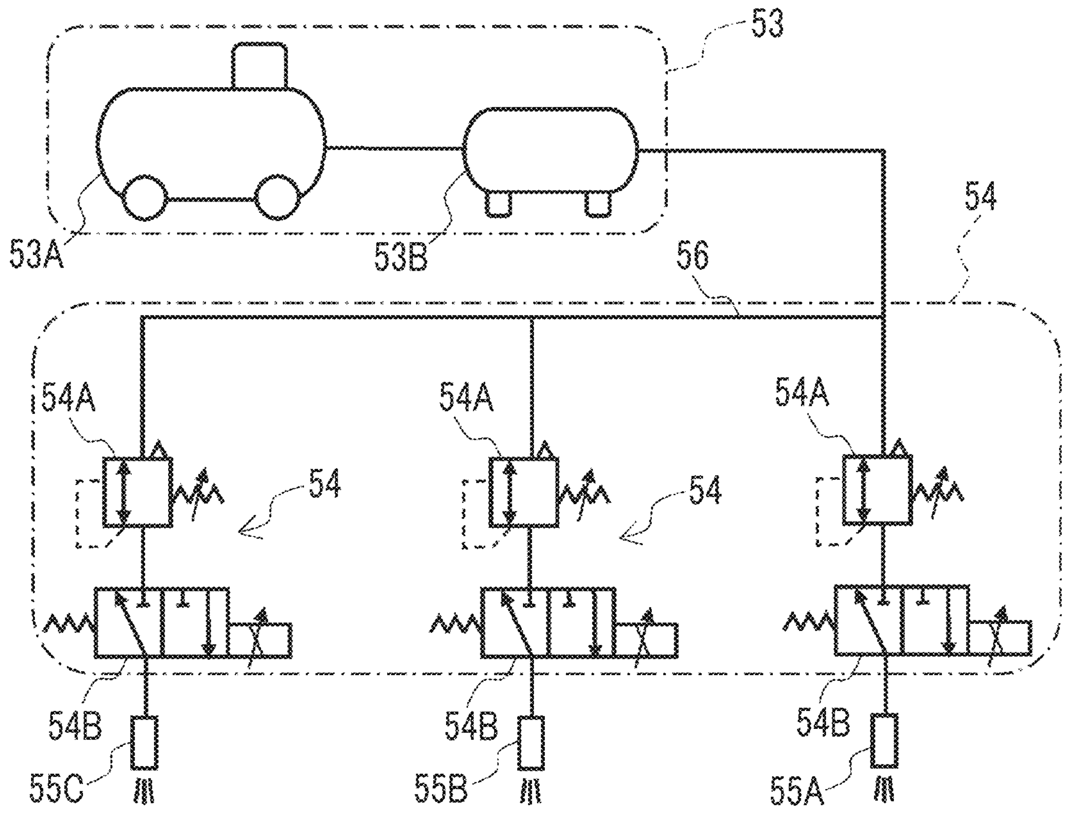
FIG. 4 is a configuration of an air supply system of the cutting waste removing device according to each embodiment.

In a case of a configuration in which compressed air is not blown, the air supply source 53 is configured by using, for example, a known blower. In a case in which the blower is applied, a speed (wind speed) of supplied air can be adjusted depending on the strength of the rotation of a fan constituting the blower. In addition, as shown in FIG. 4, the air supply source 53 includes, for example, a compressor 53A that generates the compressed air and an air tank 53B that temporarily stores the compressed air generated by the compressor 53A. In a case of a configuration in which the compressed air is not blown, the flow rate adjusting device 54 is configured by using, for example, a known damper. In a case in which the damper is applied, by opening and closing the damper, it is possible to switch between the air injection and injection stop at a higher speed than in a case in which only the blower is used.

In addition, in a case of a configuration in which the compressed air is blown, as shown in FIG. 4, the flow rate adjusting device 54 includes, for example, a pressure reducing valve 54A that reduces a pressure of the compressed air to a predetermined pressure, and an electromagnetic-type open/shut valve 54B that turns on and off the supply of the compressed air. It should be noted that, instead of the pressure reducing valve 54A, an electromagnetic-type pressure adjusting valve that adjusts the strength of the compressed air (also referred to as "blowing strength of the air" or "air pressure") may be provided. In the present embodiment, in particular, the air supply source 53 is configured by using the compressor 53A and the air tank 53B, and the flow rate adjusting device 54 includes the pressure reducing valve 54A and the open/shut valve 54B, but a case will also be described in which an electromagnetic-type pressure adjusting valve is provided instead of the pressure reducing valve 54A.

The air blow nozzle 55 includes upper nozzles 55A and 55B that are arranged above a traveling area A of the sheet 10 and that have the air blowing directions set toward the traveling area A, and lower nozzle 55C that is arranged below the traveling area A on the downstream side of the slotter device 30 and that guides the cutting waste 17, which is blown off downward from the traveling area A by the upper nozzles 55A and 55B, and an inclination plate V to a discard space S.

In addition, both the upper nozzles 55A and 55B include a nozzle for a gluing flap portion that is arranged above the traveling area of the gluing flap portion processed on one edge portion of the corrugated cardboard sheet 10 in the device width direction and that blows the air to the gluing flap waste 17*a*, a nozzle for a groove that is arranged above the traveling area in which the slots 11 and 12 of the corrugated cardboard sheet 10 are formed and that injects the air to the slot waste 17*b*, and a nozzle for an edge portion that is arranged above the traveling area in which the other edge portion of the corrugated cardboard sheet 10 in the device width direction is subjected to slit processing and that injects the air to the slit waste 17*c*.

The upper nozzle is provided with the first upper nozzle 55A arranged on the immediately downstream side of the upper slotter head 31 (slotter knives 35 and 36) of the slotter device 30, and the second upper nozzle 55B arranged on the downstream side of the slotter device 30.

The immediately downstream side of the slotter knives 35 and 36 on which the first upper nozzle 55A is arranged can be defined as a region vertically below a front end side of a rotation trajectory of the slotter knives 35 and 36 in the transfer direction TD within a region of the slotter device 30.

On the other hand, the downstream side of the slotter device 30 in which the second upper nozzle 55B is arranged is at least the downstream side of the first upper nozzle 55A, and is the further downstream side of the vicinity of the boundary with the die cutting section 4.

The first upper nozzle 55A is provided on the immediately downstream side of each knife of the first slotter device 30A, the three second slotter devices 30B, and the slitter device 39, and the second upper nozzle 55B is provided on the downstream side of each of the first slotter device 30A, the three second slotter devices 30B, and the slitter device 39. In addition, the lower nozzle 55C is arranged below the traveling area A on the downstream side of each knife. The discard space S is provided below the lower nozzle 55C over the entire region in the device width direction.

It should be noted that, in FIG. 5, a location at which each nozzle is arranged is indicated by a black star mark. The first upper nozzle 55A is arranged at a star mark location with a symbol P1, the second upper nozzle 55B is arranged at a star mark location with a symbol P2, and the lower nozzle 55C is arranged at a star mark location with a symbol P3.

In addition, as shown in FIG. 3, in the control device 52, the order information of the corrugated cardboard box 10B from the production control device 61 is input to set the strength of the compressed air blown from each of the nozzles 55A, 55B, and 55C of the air blow device 51, and the sheet movement information from the sensors 52*g* is input to grasp a timing at which the air blow device 51 is controlled to be turned on.

From the order information, a size or a weight of the cutting waste 17 can be estimated. The injection mode of the compressed air can be selected according to the size or the weight of the cutting waste 17.

The sheet movement information includes a moving speed of the sheet 10 and a timing (passing timing) at which a predetermined location of the sheet 10 (for example, a front end of the sheet 10) passes through a predetermined position on the upstream side of a cutting waste generation location of the slotter device 30 of the box making machine, and the injection timing of the compressed air can be set as the injection mode from this information.

Specific examples of the sheet movement information include the following examples.

A first example is adopted in the present embodiment, and speed command information of a main drive motor that defines a traveling speed of the sheet 10 is acquired to grasp the moving speed of the sheet 10 from this information. As passing timing information, as shown in FIG. 1A and FIG. 1B, a signal of an origin sensor 90 arranged in a drive motor (not shown) that rotationally drives the slotter device 30 is acquired to grasp the passing timing of the sheet 10. It should be noted that the origin sensor 90 is one of the sensors 52*g* (see FIG. 3), and is, for example, an encoder.

As a second example, as shown by a two-dot chain line in FIG. 1A and FIG. 1B, two sheet detection sensors 91 are arranged along the traveling area A of the sheet 10 to be separated from each other in the traveling direction of the sheet 10. The moving speed of the sheet 10 can be calculated from a difference in time when the sheet 10 passes through the two sheet detection sensors 91 and a distance between the two sheet detection sensors 91, and the passing timing of the sheet 10 can be grasped from detection information of any one sheet detection sensor. It should be noted that the sheet detection sensor 91 is one of the sensors 52*g* (see FIG. 3), and is, for example, a photoelectric sensor.

As a third example, as shown by a two-dot chain line in FIG. 1A and FIG. 1B, a sheet detection sensor 92 that detects the passage of the sheet 10 is provided along the traveling area A of the sheet 10, and an encoder 93 is installed in a roller (for example, a guide roller 57) that rotates at a rotation speed proportional to the traveling speed of the sheet, as shown by a two-dot chain line in FIG. 1A and FIG. 1B. As a result, the moving speed of the sheet 10 can be calculated from the detection information of the encoder 93, and the passing timing of the sheet 10 can be grasped from the detection information of the sheet detection sensor 92. It should be noted that the sheet detection sensor 92 is one of the sensors 52*g* (see FIG. 3), and is, for example, a photoelectric sensor. In addition, other known sensors can be used for these sensors 52*g*.

The air blowing directions of the upper nozzles 55A and 55B are set mainly in a direction to the vertically downward side.

In FIG. 6, in a drawing space on a lower side of the slotter device 30, the air blowing directions of the upper nozzles 55A and 55B are shown by using a total of 4 squares in the up, down, right, and left directions and a total of 2 squares in the up and down directions. Each of the upper nozzles 55A and 55B is set mainly in the vertically downward side in which the air blowing direction is indicated by a circle in the square. However, although it is always required that the air blowing direction includes the directional component to a vertically downward side, the air blowing direction may be inclined in a predetermined direction with respect to the vertically downward side as the injection mode.

In order to separate the cutting waste 17 from the sheet for box making 10A traveling on the downstream side as quickly and reliably as possible, in the upper nozzles 55A and 55B provided in the first slotter device 30A and the slitter device 39 positioned at both ends in the device width direction, the air blowing direction may be inclined to an outer side in the device width direction with respect to the vertically downward side, or may be inclined to the upstream side in the transfer direction TD with respect to the vertically downward side, as the injection mode. In addition, the air blowing direction may be inclined to the outer side in the device width direction and to the upstream side in the transfer direction TD with respect to the vertically downward side.

In order to separate the cutting waste 17 from the sheet for box making 10A traveling on the downstream side as far as possible, in each second slotter device 30B positioned at the intermediate portion in the device width direction, the air blowing direction may be inclined to the upstream side in the transfer direction TD with respect to the vertically downward side, as the injection mode.

That is, on the premise that the air blowing directions of the upper nozzles 55A and 55B include the directional component to a vertically downward side, in order to separate the cutting waste 17 from the sheet for boxing making 10A traveling on the downstream side as quickly as possible, as the injection mode, the air blowing directions may include a directional component to the outer side in the device width direction, or may include a directional component to the upstream side in the transfer direction TD with respect to the vertically downward side.

Figure 7:
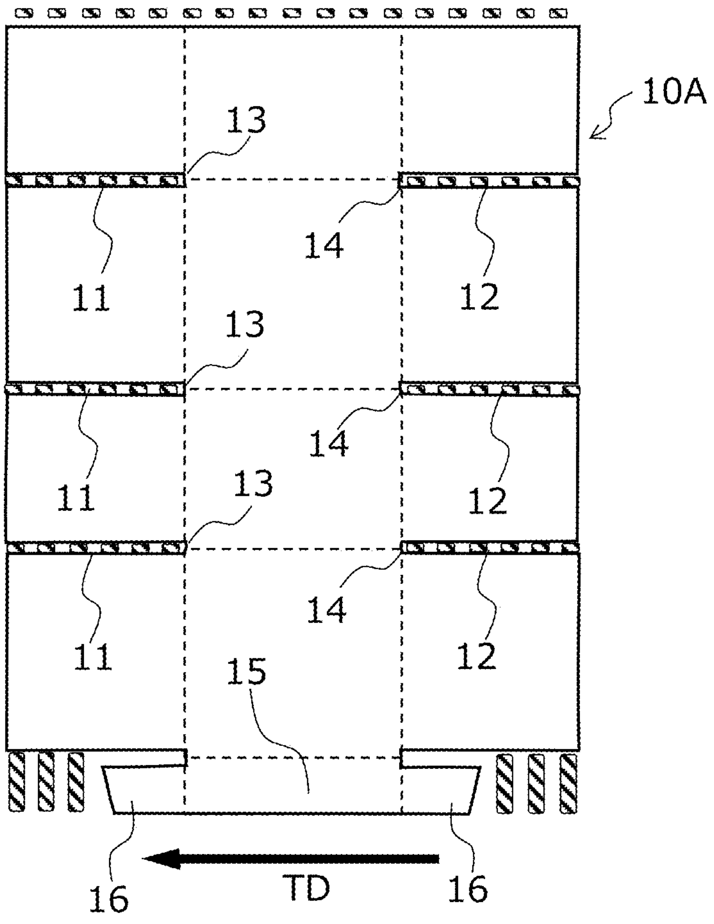
FIG. 7 is a plan view of a corrugated cardboard sheet showing a modification example of the air blowing method of the cutting waste removing device according to each embodiment.

In addition to the method of continuously injecting the compressed air as shown in FIG. 1B during the on-control period in which the air blow device 51 is turned on, there is a method of injecting the compressed air intermittently in a pulse-like manner as shown in FIG. 7. In a case in which the compressed air is intermittently injected in a pulse-like manner, the pressure of the compressed air is likely to be increased. Therefore, it is possible to remove the cutting waste 17 that is difficult to remove due to the weight or the like by utilizing the strong compressed air by using the pulse injection.

In the present embodiment, a first mode in which the compressed air is continuously injected as shown in FIG. 1B and second mode in which the compressed air is intermittently injected in a pulse-like manner as shown in FIG. 7 are provided in the on-control period in which the air blow device 51 is turned on, and the control device 52 performs the air injection by selecting the injection mode of any one of the first mode and the second mode based on the size or the weight of the cutting waste 17 that can be estimated from the order information of the corrugated cardboard box 10B.

[Actions and Effects]

Since the cutting waste removing device 50 according to the present embodiment and the slotter device 30 including the cutting waste removing device 50 have the configurations described above, the following actions and effects can be obtained. It should be noted that, in a case in which the air supply source 53 is configured by using the blower and the flow rate adjusting device 54 is configured by using the damper, the same actions and effects can be obtained.

Although the cutting processed portion or the cutting waste 17 passes through the traveling area of the cutting processed portion, such as the gluing flap portion 15 (including the over flap 16) or the slots 11 and 12, formed on the sheet 10 and the cutting waste 17, such as the gluing flap waste 17*a* or the slot waste 17*b*, the air blow device 51 is controlled to be turned on only at a timing at which the cutting waste 17 passes through the air injection region of the air blow device 51, as the injection mode, and thus the compressed air can be strongly blown only to the cutting waste 17.

Therefore, the cutting waste 17 can be reliably removed while suppressing the blowing of the compressed air to the cutting processed portion, such as the gluing flap portion 15 or the slots 11 and 12, and suppressing the swing of the gluing flap portion 15 and the over flap 16.

Figure 8:
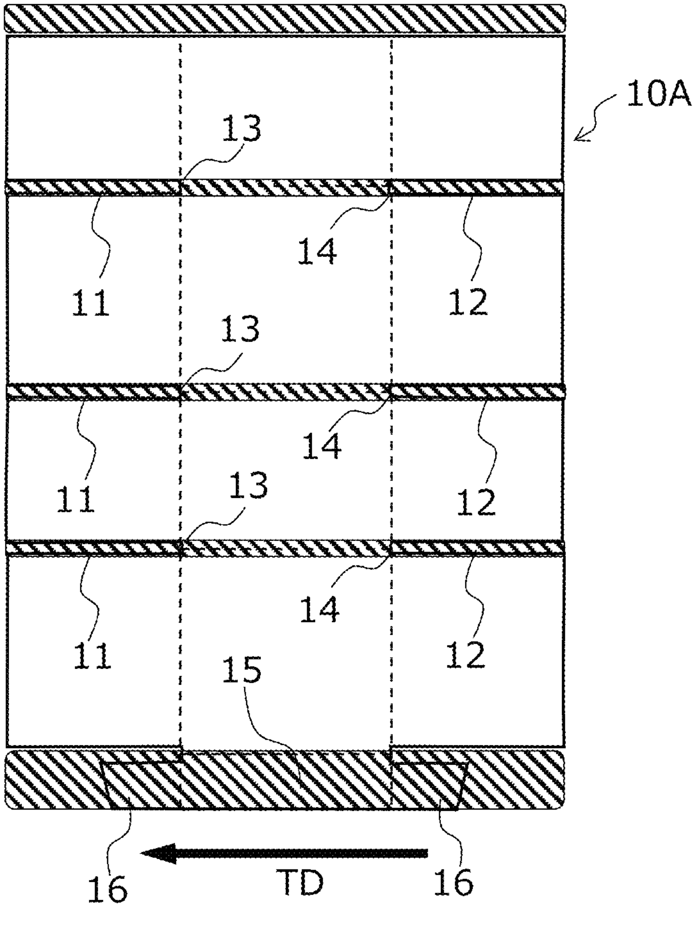
FIG. 8 is a plan view of a corrugated cardboard sheet showing an air blowing method of a comparative example of each embodiment.

That is, as shown in FIG. 8, in a case in which the compressed air is continuously injected in the device width direction through which the cutting waste 17 passes, the compressed air is blown to the cutting processed portion, such as the gluing flap portion 15 (including the over flap 16) or the slots 11 and 12, in addition to the cutting waste 17, such as the gluing flap waste 17*a* or the slot waste 17*b*.

In a case in which the compressed air is blown to the gluing flap portion 15 or the over flap 16, the gluing flap portion 15 or the over flap 16 swings and interferes with peripheral parts of the device. Therefore, a defective product may be generated in which scratches or wrinkles appear in the sheet 10 and the gluing in the next step cannot be performed normally. In addition, in a case in which the compressed air is blown to the slots 11 and 12, the air is blown to the front end portion of the sheet 10 in the transfer direction, and a portion other than the gluing flap portion 15 or the over flap 16 of the sheet 10 swings, and thus there is a risk that the interference with the peripheral parts of the device occurs to cause the deformation of the sheet 10 or the occurrence of bending or delay of the transfer. Therefore, it is difficult to blow sufficiently strong compressed air to the cutting waste 17, and in some cases, the cutting waste 17 cannot be removed.

In this device, since the blowing of the compressed air to the cutting processed portion, such as the gluing flap portion 15 or the slots 11 and 12, is suppressed, the swing of the gluing flap portion 15 or the over flap 16 or the swing of other portions of the sheet 10 is suppressed. Therefore, the occurrence of problems in which scratches or wrinkles appear on the sheet 10 and the gluing in the next step cannot be performed normally can be avoided, sufficiently strong compressed air can be blown to the cutting waste 17, and the cutting waste 17 can be reliably removed.

In addition, compared to the method of removing the cutting waste 17 by using a plurality of devices and controls in combination in a column of Technical Problem, the device configuration is simplified, and the increase in the complexity of the device and the increase in the cost can be suppressed. In addition, since the air injection is performed intermittently, it is possible to suppress an amount of the air consumption.

In addition, the control device 52 acquires the traveling timing information of the sheet 10 and turns on the air blow device 51 in the injection mode based on the traveling timing information. Therefore, the air injection can be reliably performed only on the cutting waste 17 at an appropriate timing.

Further, the control device 52 acquires the order information (for example, the size or the weight of the cutting waste 17) of the corrugated cardboard box 10B and turns on the air blow device 51 in the injection mode based on the order information. Therefore, for example, the strength of the compressed air can be adjusted, and the cutting waste 17 can be reliably removed with a required strength of the compressed air.

In particular, in the present embodiment, as the injection mode of the compressed air by the air blow device 51, the mode (second mode) in which the air is injected in a pulse-like manner is provided during the on-control period in which the air blow device 51 is turned on. Therefore, with respect to the cutting waste 17 that requires the compressed air having a high pressure, the cutting waste 17 can be reliably removed by using the second mode.

It should be noted that, as a method of changing the injection mode of the compressed air, the electromagnetic-type pressure adjusting valve can also be used as the flow rate adjusting device. That is, the control device 52 controls the pressure adjusting valve in the injection mode based on the order information of the corrugated cardboard box 10B to adjust the strength of the compressed air. As a result, with respect to the cutting waste 17 that requires the compressed air having a high pressure, the cutting waste 17 can be reliably removed by controlling the pressure adjusting valve to increase the strength of the compressed air. In addition, with respect to the cutting waste 17 that does not require the compressed air having a relatively high pressure, by controlling the pressure adjusting valve to reduce the strength of the compressed air, it is possible to suppress the amount of the air consumption while ensuring that the cutting waste 17 can be reliably removed.

In addition, the cutting waste 17, which is cut, can be quickly and reliably separated and removed by the upper nozzles 55A and 55B.

In particular, the cutting waste 17 immediately after being cut can be quickly and reliably separated and removed by the first upper nozzle 55A arranged on the immediately downstream side of the slotter knives 35 and 36 of the slotter device 30.

In addition, the cutting waste 17, which is not removed in a case in which it is difficult to install the first upper nozzle 55A, or the cutting waste 17, which cannot be separated and removed by the first upper nozzle 55A, can be reliably separated and removed by the second upper nozzle 55B arranged on the downstream side of the slotter device 30.

As the injection mode, by setting the air blowing directions of the upper nozzles 55A and 55B to include the directional component to a vertically downward side, the cutting waste 17 cut by the upper nozzles 55A and 55B can be quickly and reliably separated and removed vertically downward.

In addition, as the injection mode, by setting the air blowing directions of the upper nozzles 55A and 55B to include the directional component to the outer side in the device width direction, the cutting waste 17 cut by the upper nozzles 55A and 55B can be quickly and reliably separated and removed to the outer side in the device width direction.

Further, as the injection mode, by setting the air blowing directions of the upper nozzles 55A and 55B to include the directional component to the upstream side in the traveling direction, the cutting waste 17 cut by the upper nozzles 55A and 55B can be quickly and reliably separated and removed to the upstream side in the traveling direction.

By providing the lower nozzle 55C, the cutting waste 17 blown off downward from the traveling area A by the upper nozzles 55A and 55B can be reliably guided to the discard space S.

Modification Example of First Embodiment

As described above, in the present embodiment, the control device 52 selects, as the injection mode, the blowing strength of the air (air pressure) and a blowing interval of the air based on the order information, that is, selects any one of the first mode (air is continuously injected) and the second mode (air is injected in a pulse-like manner), and adjusts a pulse interval in a case in which the second mode is selected. However, for this configuration, a database that associates the order information with the injection mode of the air is required.

On the other hand, a configuration may be adopted in which, without preparing the database, the blowing strength of the air, the blowing interval of the air, or the pulse interval with respect to the order information is manually set, and so-called teaching is performed using the setting information. Here, control of the blowing strength of the air, the blowing interval of the air, or the pulse interval will be described.

In this control, in a case in which the operator changes the setting of the blowing strength of the air, the selection of the blowing interval of the air (selection of any one of the first mode or the second mode), or the pulse interval in a case in which the second mode is selected, the control device 52 stores the changed setting value in that case in association with the order information, calls the stored setting value when a similar order arrives next time, automatically sets the blowing strength of the air, the blowing interval of the air (selection of any one of the first mode and the second mode), or the pulse interval based on the setting value, and controls the pressure adjusting valve or the open/shut valve 54B.

Here, a configuration will be described in which operation buttons for adjusting the blowing strength of the air, setting the blowing interval of the air, and adjusting the pulse interval in a case in which the air is blown in a pulse-like manner are displayed on the touch panel display 52*i*, and the blowing strength of the air, the blowing interval of the air, and the pulse interval in a case in which the air is blown in a pulse-like manner can be adjusted by performing a touch operation of the operation button.

Figure 9:
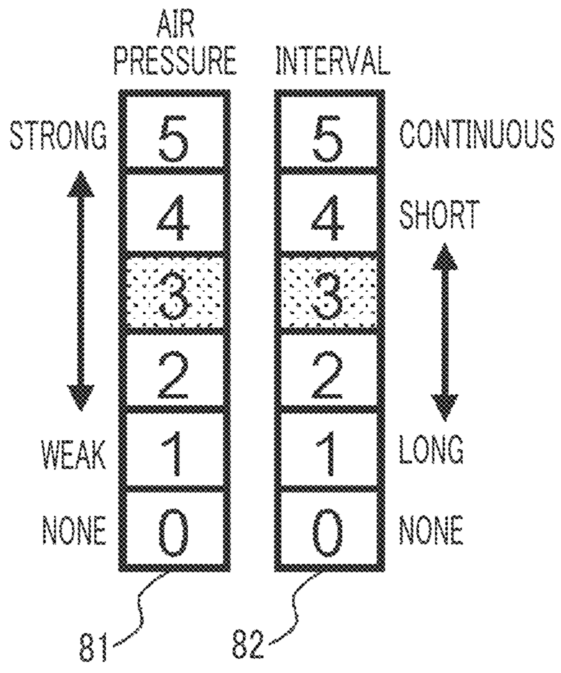
FIG. 9 is a diagram showing a first example of operation buttons displayed on a touch panel display according to a modification example of the first embodiment.

FIG. 9 is a diagram showing a first example of the operation buttons displayed on the touch panel display 52*i*. As shown in FIG. 9, the operation buttons include a blowing strength adjustment button 81 for adjusting the blowing strength of the air, and a blowing interval setting button 82 for setting the blowing interval of the air and adjusting the pulse interval in a case in which the air is blown in a pulse-like manner.

The blowing strength adjustment button 81 is provided with a touch space in which numerals in six stages from 0 to 5 are described, "0" is touched in a case in which the air is not to be blown (that is, the blowing is stopped), and any one of "1" to "5" is touched in a case in which the air is to be blown. A stronger blowing strength is set as the numerical value is larger.

The blowing interval setting button 82 is also provided with a touch region in which numerals in six stages from 0 to 5 are described, “0” is touched in a case in which the air is not to be blown (that is, the blowing is stopped), and any one of “1” to “5” is touched in a case in which the air is to be blown. “5” is a button for setting the air to be continuously blown. “1” to “4” are buttons for setting the air to be blown in a pulse-like manner. In a case in which the air is blown in a pulse-like manner, a length of an injection time of each pulse injection is fixed, and, an injection interval of the pulse injection is set to be shorter as the numerical values of “1” to “4” are larger. Therefore, as the numerical value is larger, the number of injection pulses blown to one cut surface is larger, and the total amount of the air blown is increased.

It should be noted that, in a case of the second mode in which the air is blown in a pulse-like manner, the length of the injection time of each pulse injection is not fixed and may be variable as the injection mode. For example, the number of injection pulses in a unit time is fixed, and the length of the injection time of each pulse injection is variable. In this case, in a case in which the length of the injection time of each pulse injection is set to be longer as the numerical value is larger, the total amount of the air blown to one cut surface is increased as the numerical value is larger.

Figure 10:
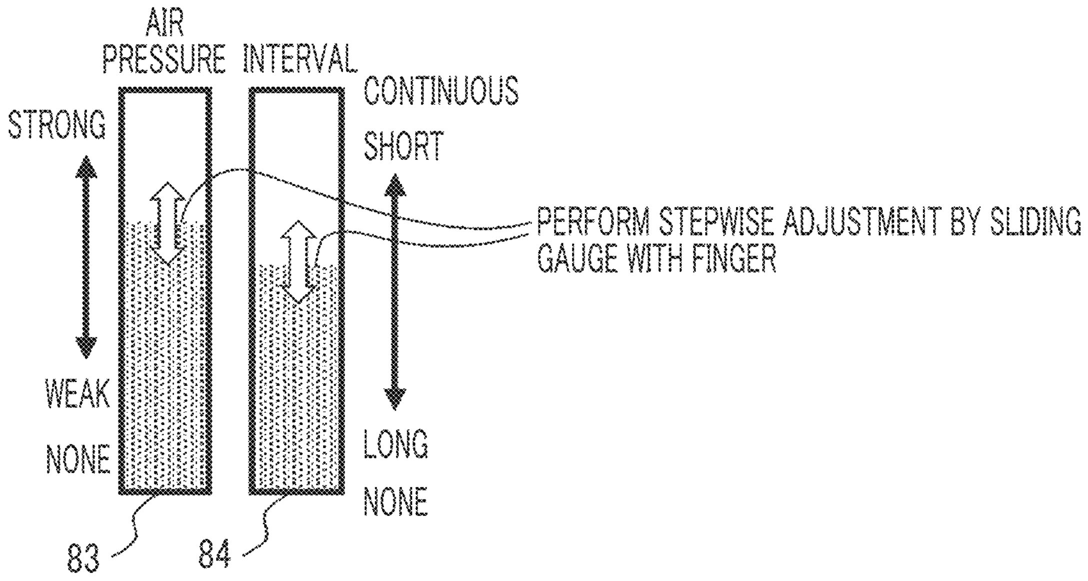
FIG. 10 is a diagram showing a second example of the operation buttons displayed on the touch panel display according to the modification example of the first embodiment.

FIG. 10 is a diagram showing a second example of the operation buttons displayed on the touch panel display 52*i*. As shown in FIG. 10, the operation buttons also include a blowing strength adjustment button 83 for adjusting the blowing strength of the air, and a blowing interval setting button 84 for setting the blowing interval of the air and adjusting the pulse interval in a case in which the air is blown in a pulse-like manner.

In this example, each of the buttons 83 and 84 is displayed as a bar graph-shaped gauge, and a length of the gauge is adjusted steplessly by touching and sliding an upper end of the gauge with a finger.

In a case of the blowing strength adjustment button 83, in a case in which the length of the gauge is set to 0, a state is set in which the air is not to be blown (blowing is stopped). As the length of the gauge is increased, the blowing strength is set to be stronger as the gauge is longer. As a result, the blowing strength can be set steplessly.

In a case of the blowing interval setting button 84, in a case in which the length of the gauge is set to 0, a state is set in which the air is not to be blown (blowing is stopped). In a case in which the length of the gauge is increased, first, the blowing interval for blowing the air in a pulse-like manner is set, and in a case in which the length of the gauge is maximized, a state is set in which the air is to be continuously blown. In a case in which the air is blown in a pulse-like manner, a length of an injection time of each pulse injection is fixed, and, an injection interval of the pulse injection is set to be shorter as the length of the gauge is longer. Therefore, as the length of the gauge is longer, the number of injection pulses blown to one cut surface is larger, and the total amount of the air blown is increased.

Figure 11:
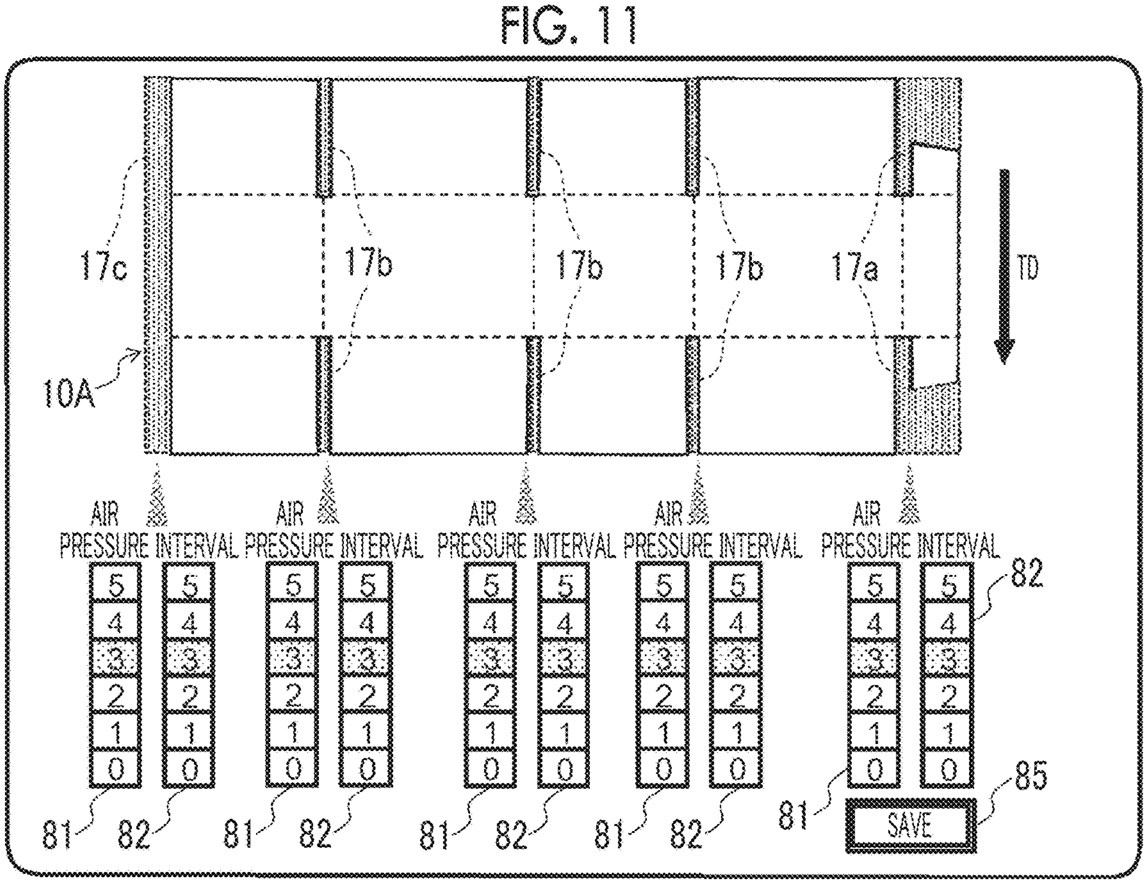
FIG. 11 is a diagram showing a display screen displayed on the touch panel display according to the modification example of the first embodiment and showing an operation example of the displayed operation button.

For example, in a case in which the first example (see FIG. 9) of the operation button is applied in a case of controlling the blowing of the air to the upper nozzle 55A, a screen as shown in FIG. 11 is displayed on the touch panel display 52*i*. On an upper portion of the screen, a pattern simulating a plan view of the sheet for box making 10A is displayed to be overlaid with a pattern of each cutting waste 17 of the gluing flap waste 17*a*, the slot waste 17*b*, or the slit waste 17*c*, and the blowing strength adjustment button 81 and the blowing interval setting button 82 are displayed corresponding to a lower side of each cutting waste 17.

The operation of the corresponding upper nozzle 55A can be controlled by each of the blowing strength adjustment button 81 and the blowing interval setting button 82.

In addition, a save button 85 is displayed at a lower right portion of the screen of the touch panel display 52*i*, and the setting value manually set at that case is saved (stored) in the storage unit 52*b* by touching the save button 85.

In the example shown in FIG. 11, both the blowing strength adjustment button 81 and the blowing interval setting button 82 of each of the upper nozzles 55A are all set to a default value of “3” (that is, the blowing strength is at a “medium” level, the second mode is selected in which the air is blown in a pulse-like manner, and the pulse interval is the second from the shortest pulse interval among the four stages).

For example, in the default state shown in FIG. 11, in a case in which the slit waste 17*c* is not properly separated and removed, regarding the upper nozzle 55A that blows the air at the slit waste 17*c*, the operator changes the blowing strength adjustment button 81 and the blowing interval setting button 82 such that the slitter waste 17*c* can be properly separated and removed.

Figure 12:
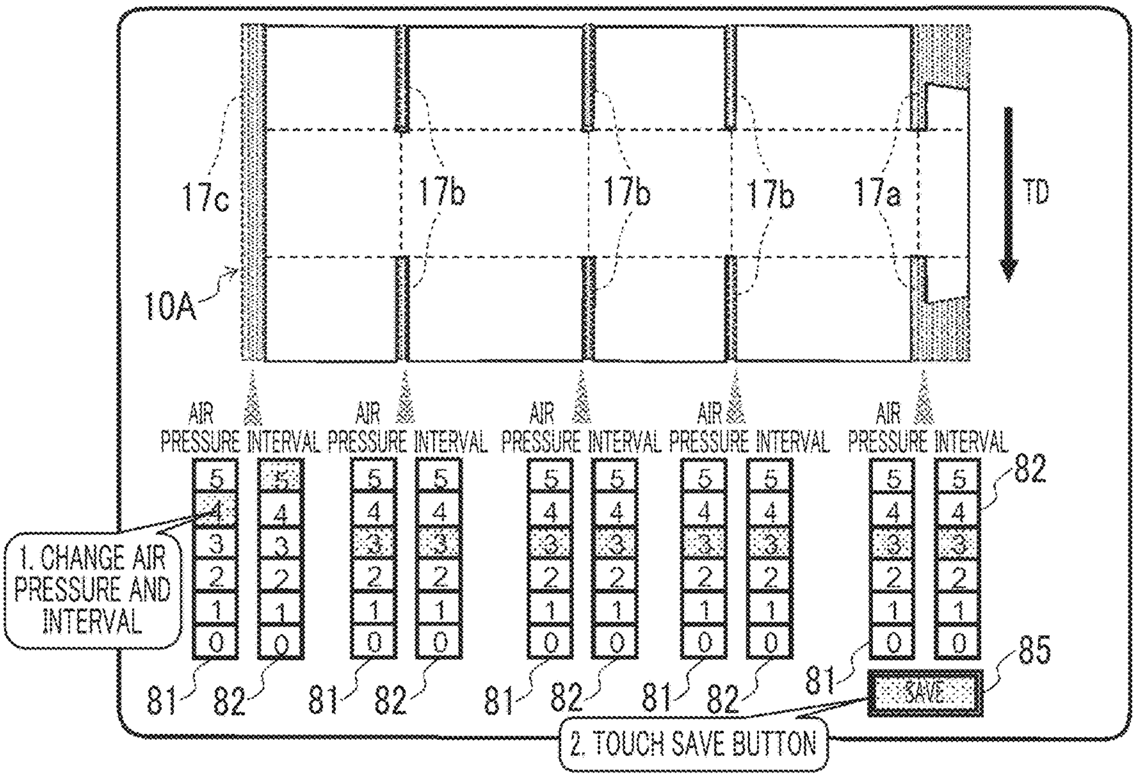
FIG. 12 is a diagram showing a change operation example of the operation button displayed on the display screen of FIG. 11.

Here, as shown in FIG. 12, the blowing strength adjustment button 81 is changed from “3” to “4” (blowing strength is increased by one stage), and the blowing interval setting button 82 is changed from “3” to “5” (switch to continuous injection in the first mode). As a result, in a case in which it is determined that the air injection is appropriate, the save button 85 is touched.

As a result, when a similar order arrives next time, the control device 52 automatically calls the stored setting value and controls the air injection based on the setting value. That is, the control device 52 controls the air blowing device 51 in the air injection mode stored in the storage unit 52*b*.

In this way, by performing the teaching regarding the injection mode, the injection mode can be automatically and appropriately controlled thereafter under the same condition.

In addition, by creating the database of teaching results, it is possible to automatically and appropriately control the injection mode in various operation ranges.

Second Embodiment

[Main Section Configuration]

A slotter device including a cutting waste removing device according to the second embodiment will be described. It should be noted that, in the present embodiment, a slotter device 130 as the double slotter will be described. In addition, the points different from the points of the first embodiment will be mainly described, and the description of the same points as the points of the first embodiment will be omitted.

Figure 13:
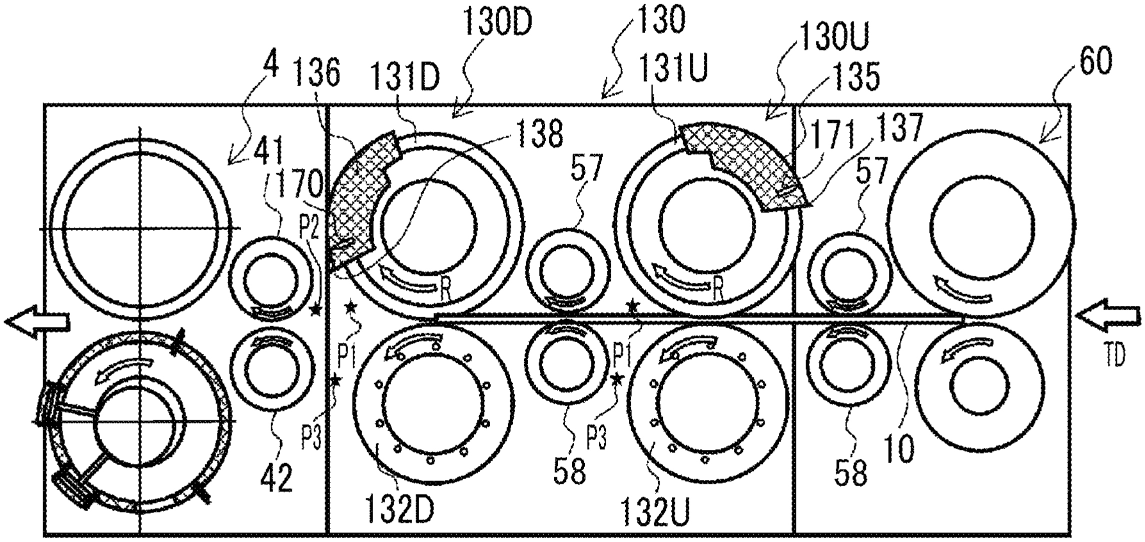
FIG. 13 is a schematic side view showing a slotter device according to a second embodiment.

As shown in FIG. 13, the transfer rollers 57 and 58 are provided upstream of the slotter device 130. The transfer rollers 57 and 58 transfer the sheet 10, which is subjected to the creasing by the creaser device 60, at a constant transfer speed along the transfer direction TD, and supply the sheet 10 to the slotter device 130.

Figure 14:
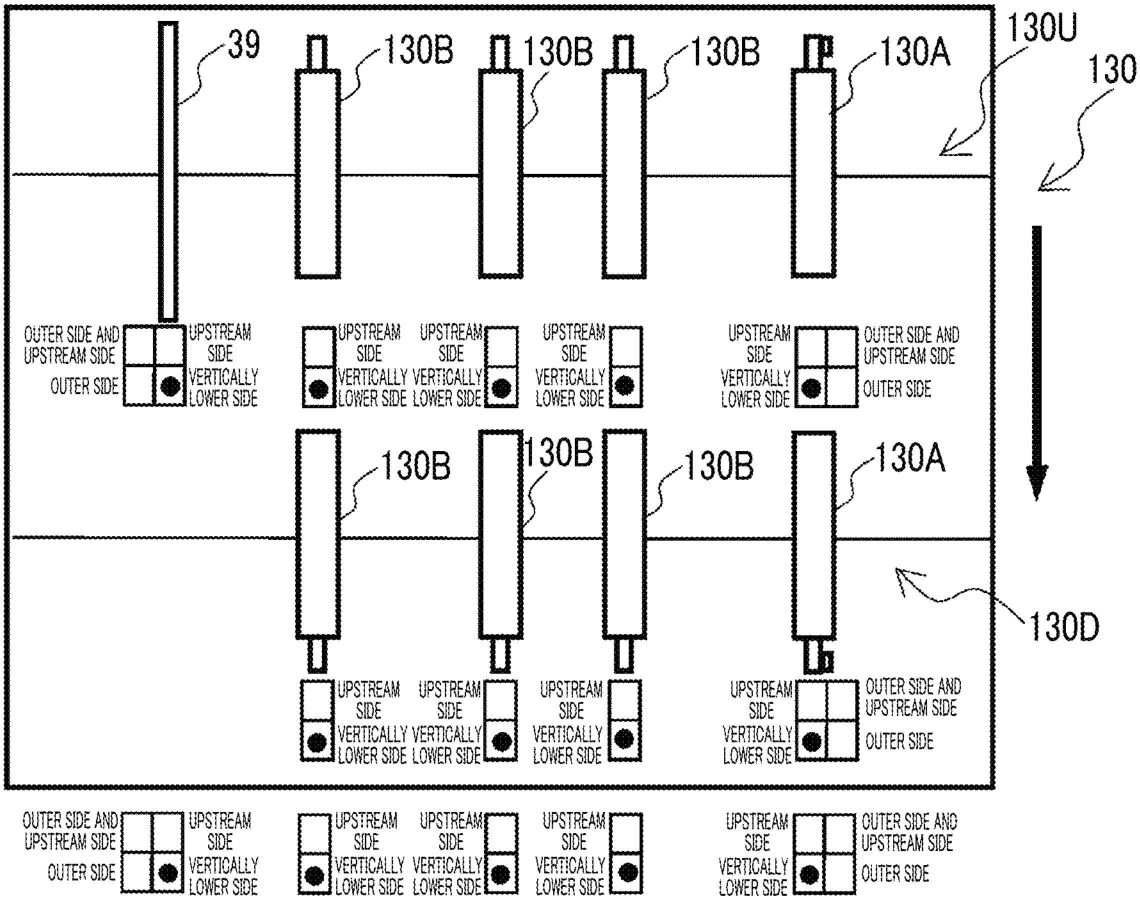
FIG. 14 is a schematic plan view of the slotter device of FIG. 13, and also shows the air blowing direction of the air blow nozzle arranged in each portion.

As shown in FIG. 14, the slotter device 130 includes a first slotter device 130A that cuts the removal portion 15*a* (see FIG. 1B) on the front side of the gluing flap portion 15 in the transfer direction TD and cuts the removal portion 15*b* (see FIG. 1B) on the rear side of the gluing flap portion 15 in the transfer direction TD at one edge portion of the sheet 10 in order to form the gluing flap portion 15 (including the over flap 16), and three second slotter devices 130B that cut the slot 11 (see FIG. 1B) on the front side in the transfer direction TD and the slot 12 (see FIG. 1B) on the rear side in the transfer direction TD. In addition, the slotter device 130 is provided with the slitter device 39 that cuts the edge portion of the sheet 10 at the other edge portion of the sheet 10.

It should be noted that, in the following description, in a case in which the distinction is not required, the first slotter device 130A, the second slotter device 130B, and the slitter device 39 will be referred to as the slotter device 130.

Each slotter device 130 includes an upstream slotter device 130U arranged on the rear side (upstream side) in the transfer direction TD, and a downstream slotter device 130D arranged on the front side (downstream side) in the transfer direction TD. The transfer rollers 57 and 58 are provided between the upstream slotter device 130U and the downstream slotter device 130D.

The upstream slotter device 130U includes an upper slotter head 1310 and a lower slotter head 1320 that are arranged to vertically face each other with the transfer passage of the sheet 10 interposed therebetween, and the downstream slotter device 130D includes an upper slotter head 131D and a lower slotter head 132D that are arranged to vertically face each other with the transfer passage of the sheet 10 interposed therebetween.

A first slotter knife 135 is attached to the upper slotter head 1310, and although details are not shown, the lower slotter head 132U is provided with a receiving knife including two knives attached to correspond to the first slotter knife 135 at intervals. Similarly, a second slotter knife 136 is attached to the upper slotter head 131D, and although details are not shown, the lower slotter head 132D is provided with a receiving knife including two knives attached to correspond to the second slotter knife 136 at intervals.

Protrusion portions 137 and 138 protruding from a knife edge are provided, respectively, at a front end portion of the first slotter knife 135 in the rotation direction R and at a rear end portion of the second slotter knife 136 in the rotation direction R. By piercing the sheet 10, the protrusion portions 137 and 138 the cut end portions 13 and 14 of the slots 11 and 12 (see FIG. 1B), respectively. In addition, gluing flap knives 170 and 171 are provided on side surfaces of the first slotter knife 135 and the second slotter knife 136, respectively. The gluing flap knives 170 and 171 cut the end portion of the gluing flap portion 15. It should be noted that the gluing flap knives 170 and 171 can be moved along an arc direction of the first slotter knife 135 and the second slotter knife 136 by a mechanism (not shown).

A relative rotation phase difference between a rotation phase of the first slotter knife 135 of the upstream slotter device 130U and a rotation phase of the second slotter knife 136 of the downstream slotter device 130D is set depending on a box depth determined as the specifications of the corrugated cardboard to be processed.

The cutting waste removing device according to the present embodiment is also a device for removing the cutting waste generated by cutting using the slotter device 130, and includes the air blow device 51 and the control device 52 that performs the intermittent on/off control of the operation of the air blow device 51, as in the cutting waste removing device 50 according to the first embodiment.

In the present embodiment, since the slotter device 130 includes the upstream slotter device 130U and the downstream slotter device 130D, the number of the first upper nozzles 55A and the number of the lower nozzles 55C are increased as compared with a case of the first embodiment.

Other configurations of the air blow device 51 excluding this point and the control device 52 are the same as the configurations of the first embodiment shown in FIG. 1A, FIG. 3, and FIG. 4.

In FIG. 13, as in the first embodiment (see FIG. 5), a location at which each of the nozzles 55A to 55C is arranged is indicated by a black star mark. The first upper nozzle 55A is arranged at a star mark location with the symbol P1, the second upper nozzle 55B is arranged at a star mark location with the symbol P2, and the lower nozzle 55C is arranged at a star mark location with the symbol P3. That is, the first upper nozzle 55A and the lower nozzle 55C are provided to correspond to each knife.

In FIG. 14, on a lower side of the upstream slotter device 130U of the slotter device 130, a lower side of the downstream slotter device 130D of the slotter device 130, and further a lower side of the slitter device 39, the air blowing direction of each first upper nozzle 55A is shown by using a total of 4 squares in the up, down, right, and left directions and a total of 2 squares in the up and down directions. In addition, on a lowermost portion of a drawing space, the air blowing direction of each second upper nozzle 55B is shown by using a total of 4 squares in the up, down, right, and left directions and a total of 2 squares in the up and down directions. Each of the upper nozzles 55A and 55B is set mainly in the vertically downward side in which the air blowing direction is indicated by a circle in the square. However, although it is always required that the air blowing direction includes the directional component to a vertically downward side, the air blowing direction may be inclined in a predetermined direction with respect to the vertically downward side.

[Actions and Effects]

Since the cutting waste removing device 50 according to the present embodiment and the slotter device 130 including the cutting waste removing device 50 have the configurations described above, the same actions and effects as the actions and effects of the first embodiment can be obtained.

Third Embodiment

[Main Section Configuration]

A slotter device including a cutting waste removing device according to the third embodiment will be described. It should be noted that, in the present embodiment, a slotter device 230 as the dual slotter will be described. In addition, the points different from the points of the first embodiment will be mainly described, and the description of the same points as the points of the first embodiment will be omitted.

Figure 15:
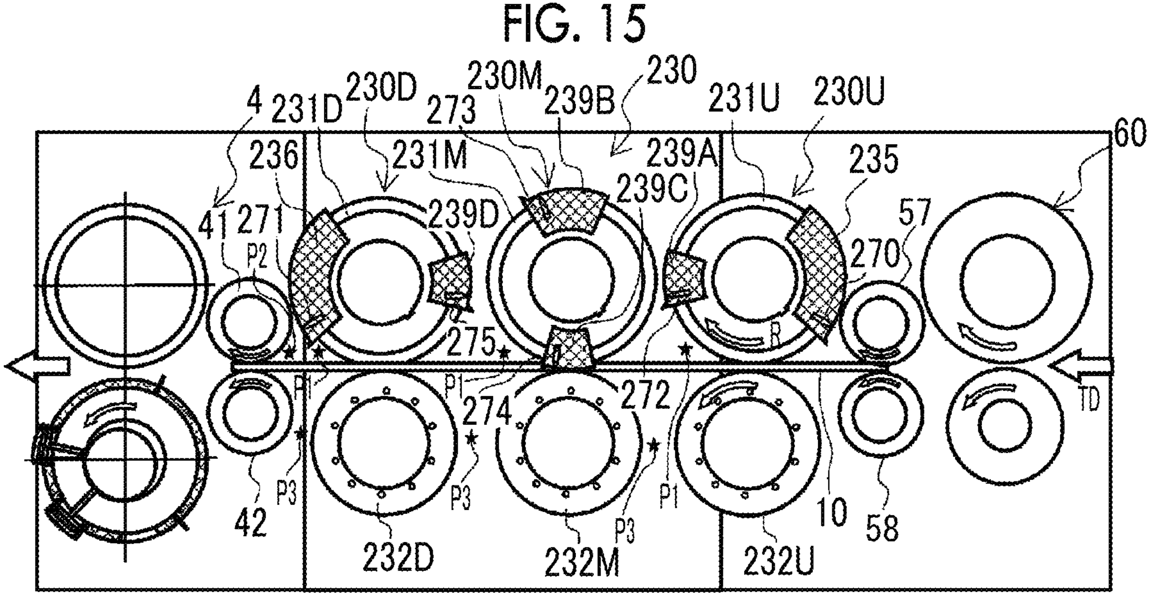
FIG. 15 is a schematic side view showing a slotter device according to a third embodiment.

As shown in FIG. 15, the transfer rollers 57 and 58 are provided upstream of the slotter device 230. The transfer rollers 57 and 58 transfer the sheet 10, which is subjected to the creasing by the creaser device 60, at a constant transfer speed along the transfer direction TD, and supply the sheet 10 to the slotter device 230.

The slotter device 230 is the dual slotter to which a manufacturing method called 2-up production, which manufactures two boxes arranged in front of and behind the transfer direction TD from one corrugated cardboard sheet, can be applied.

Figure 16:
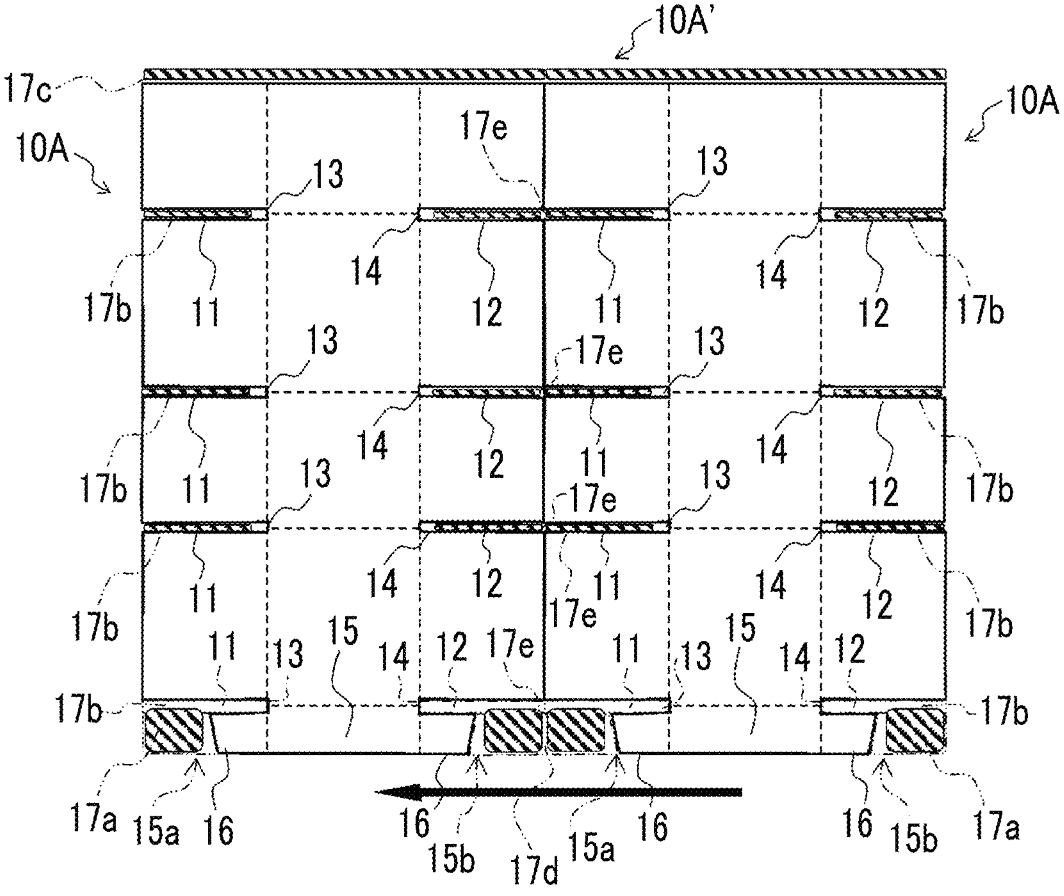
FIG. 16 is a plan view of a corrugated cardboard sheet manufactured by the 2-UP method by the slotter device of FIG. 15.

As shown in FIG. 16, in a sheet for box making 10A' in a case of the 2-up production, the removal portion 15*a* on the front side in the transfer direction TD of the first sheet for box making sheet 10A and the slot 11 on the front side in the transfer direction TD are subjected to the cutting processing on a downstream end portion in the transfer direction TD of the sheet 10, and the removal portion 15*b* on the rear side in the transfer direction TD of the second sheet for box making 10A and the slot 12 on the rear side in the transfer direction TD are subjected to the cutting processing on an upstream side end portion in the transfer direction TD of the sheet 10.

Then, on a mutual portion between the two sheets for box making 10A that are connected to each other, the removal portion 15*b* on the rear side in the transfer direction TD of the first sheet for box making 10A and the removal portion 15*a* on the front side in the transfer direction TD of the second sheet for box making 10A are subjected to the cutting processing, and the slot 12 on the rear side in the transfer direction TD of the first sheet for box making 10A and the slot 11 on the front side in the transfer direction TD of the second sheet for box making 10A are subjected to the cutting processing. As a result, a gluing flap waste 17*d* and a slot waste 17*e* are generated from the mutual portion between the two sheets for box making 10A.

Figure 17:
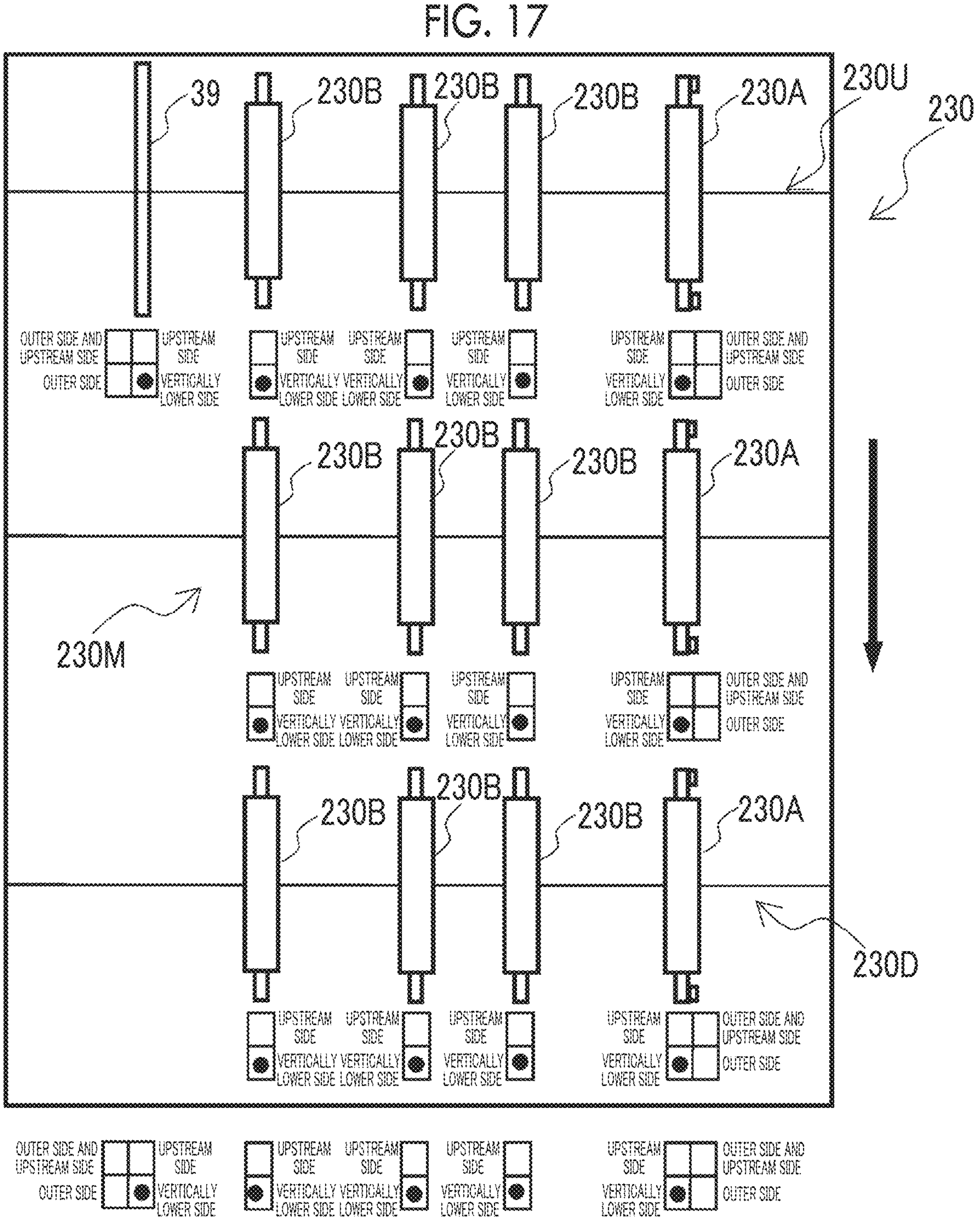
FIG. 17 is a schematic plan view of the slotter device of FIG. 15, and also shows the air blowing direction of the air blow nozzle arranged in each portion.

As shown in FIG. 17, the slotter device 230 includes a first slotter device 230A that cuts the removal portion 15*a* (see FIG. 16) on the front side of the gluing flap portion 15 in the transfer direction TD and cuts the removal portion 15*b* (see FIG. 16) on the rear side of the gluing flap portion 15 in the transfer direction TD at one edge portion of the sheet 10 in order to form the gluing flap portion 15 (including the over flap 16), and three second slotter devices 230B that cut the slot 11 (see FIG. 16) on the front side in the transfer direction TD and the slot 12 (see FIG. 16) on the rear side in the transfer direction TD. In addition, the slitter device 39 that cuts the edge portion of the sheet 10 is provided at the other edge portion of the sheet 10.

It should be noted that, in the following description, in a case in which the distinction is not required, the first slotter device 230A, the second slotter device 230B, and the slitter device 39 will be referred to as the slotter device 230.

As shown in FIG. 15 and FIG. 17, the slotter device 230 includes an upstream slotter device 230U, an intermediate slotter device 230M, and a downstream slotter device 230D in this order from the rear side (upstream side) in the transfer direction TD.

Each of the slotter devices 2300, 230M, and 230D includes upper slotter heads 2310, 231M, and 231D and lower slotter heads 2320, 232M, and 232D that are arranged to vertically face each other with the transfer passage of the sheet 10 interposed therebetween.

A first slotter knife 235 and a third slotter knife 239A are attached to the upper slotter head 2310, and although details are not shown, the lower slotter head 2320 is provided with a receiving knife including two knives attached to correspond to the first slotter knife 235 and the third slotter knife 239A at intervals.

A fourth slotter knife 239B and a fifth slotter knife 239C are attached to the upper slotter head 232M, and although details are not shown, the lower slotter head 132M is provided with a receiving knife including two knives attached to correspond to the fourth slotter knife 239B and the fifth slotter knife 239C at intervals.

A second slotter knife 236 and a sixth slotter knife 239D are attached to the upper slotter head 231D, and although details are not shown, the lower slotter head 232D is provided with a receiving knife including two knives attached to correspond to the second slotter knife 236 and the sixth slotter knife 239D at intervals.

Protrusion portions protruding from the knife edge are provided on the front end portions in the rotation direction R of the first slotter knife 235, the fifth slotter knife 239C, and the sixth slotter knife 239D, and the rear end portions in the rotation direction R of the second slotter knife 236, the third slotter knife 239A, and the fourth slotter knife 239B, respectively. By piercing the sheet 10, each of the protrusion portions cut the end portions 13 and 14 of the slots 11 and 12 (see FIG. 16), respectively.

In addition, gluing flap knives 270, 271, 272, 273, 274, and 275 are provided on the side surfaces of the first slotter knife 235, the second slotter knife 236, the third slotter knife 239A, the fourth slotter knife 239B, the fifth slotter knife 239C, and the sixth slotter knife 239D, respectively. The gluing flap knives 270, 271, 272, 273, 274, and 275 cut the end portion of the gluing flap portion 15. It should be noted that the gluing flap knives 270, 271, 272, 273, 274, and 275 can be moved along an arc direction of each slotter knife by a mechanism (not shown).

In a case of the 2-up production, for example, the first slotter knife 235 performs the cutting processing on the removal portion 15*b* on the rear side in the transfer direction TD of the second sheet for box making 10A and the slot 12 on the rear side in the transfer direction TD, and the second slotter knife 236 performs the cutting processing on the removal portion 15*a* on the front side in the transfer direction TD of the first sheet for box making 10A and the slot 11 on the front side in the transfer direction TD. Then, the third to sixth slotter knives 239A to 239D are selectively combined and used to perform, on the mutual portion between the two sheets for box making 10A, the cutting processing on the removal portion 15*b* on the rear side in the transfer direction TD of the first box making sheet 10A and the removal portion 15*a* on the front side in the transfer direction TD of the second sheet for box making 10A, and the cutting processing on the slot 12 on the rear side in the transfer direction TD of the first sheet for box making 10A and the slot 11 on the front side in the transfer direction TD of the second sheet for box making 10A.

The cutting waste removing device according to the present embodiment is also a device for removing the cutting waste generated by cutting using the slotter device 230, and includes the air blow device 51 and the control device 52 that performs the intermittent on/off control of the operation of the air blow device 51, as in the cutting waste removing device 50 according to the first embodiment.

In the present embodiment, since the slotter device 230 includes the upstream slotter device 230U, the intermediate slotter device 230M, and the downstream slotter device 230D, the number of the first upper nozzles 55A and the number of the lower nozzles 55C are increased as compared with cases of the first and second embodiments.

Other configurations of the air blow device 51 excluding this point and the control device 52 are the same as the configurations of the first embodiment shown in FIG. 1A, FIG. 3, and FIG. 4.

In FIG. 15, as in the first embodiment (see FIG. 5), a location at which each of the nozzles 55A to 55C is arranged is indicated by a black star mark. The first upper nozzle 55A is arranged at a star mark location with the symbol P1, the second upper nozzle 55B is arranged at a star mark location with the symbol P2, and the lower nozzle 55C is arranged at a star mark location with the symbol P3. That is, the first upper nozzle 55A and the lower nozzle 55C are provided to correspond to each knife.

In FIG. 17, on a lower side of the upstream slotter device 230U of the slotter device 230, a lower side of the intermediate slotter device 230M of the slotter device 230, a lower side of the downstream slotter device 230D of the slotter device 230, and further a lower side of the slitter device 39, the air blowing direction of each first upper nozzle 55A is shown by using a total of 4 squares in the up, down, right, and left directions and a total of 2 squares in the up and down directions. In addition, on a lowermost portion of a drawing space, the air blowing direction of each second upper nozzle 55B is shown by using a total of 4 squares in the up, down, right, and left directions and a total of 2 squares in the up and down directions. Each of the upper nozzles 55A and 55B is set mainly in the vertically downward side in which the air blowing direction is indicated by a circle in the square. However, although it is always required that the air blowing direction includes the directional component to a vertically downward side, the air blowing direction may be inclined in a predetermined direction with respect to the vertically downward side.

[Actions and Effects]

Since the cutting waste removing device 50 according to the present embodiment and the slotter device 230 including the cutting waste removing device 50 have the configurations described above, the same actions and effects as the actions and effects of the first embodiment can be obtained.

Fourth Embodiment

A fourth embodiment will be described in which a nozzle direction change mechanism (details are not shown) that changes the air blowing direction of the air blow nozzle 55 is provided as a further configuration in addition to the first to third embodiments described above regarding the air blow nozzle 55. The configuration of the present embodiment can be applied to any of the first to third embodiments described above.

Here, an example will be described in which the nozzle direction change mechanism is added to the upper nozzles 55A and 55B.

Figure 18:
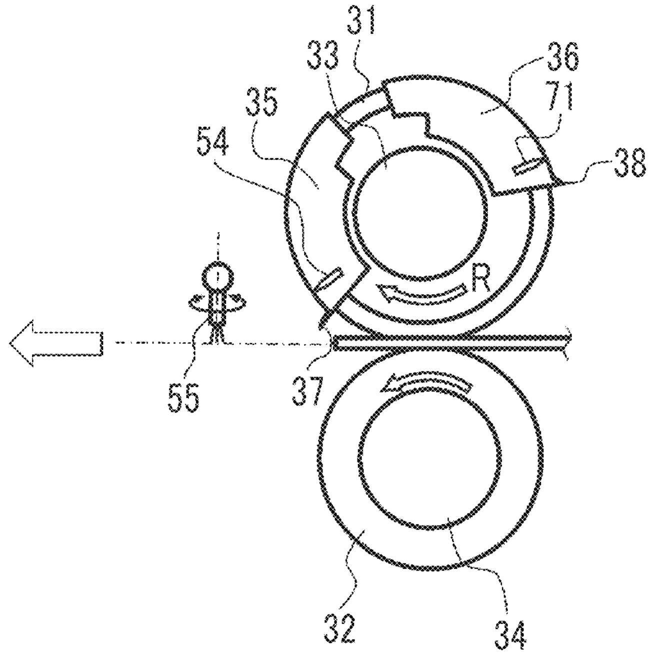
FIG. 18 is a main section side view for describing a cutting waste removing device according to a fourth embodiment.

As shown in FIG. 18, on the premise that a downward directional component is included in the air blowing direction of the air blow nozzle 55, the nozzle direction change mechanism is provided such that all the upper nozzles 55A and 55B can change an injection direction of a tip portion by 360° around an axis of the nozzle (indicated by a one-dot chain line in FIG. 18) with a nozzle base end portion as a fulcrum. The nozzle base end portion in which the air is introduced into the nozzle is interposed at a ball joint, a bellows pipe, or the like, and configured such that the injection direction can be changed while maintaining airtightness. It should be noted that FIG. 18 shows an example applied to the slotter device according to the first embodiment.

It should be noted that the rotation direction of the nozzle is configured such that the operator manually adjusts a direction of the tip of the nozzle by observing the behavior of the cutting waste, adjusts the direction of the tip of the nozzle by a drive device (not shown).

Further, the direction of the tip of the nozzle may be fixable after being adjusted at the time of installation of the box making machine.

According to the present embodiment, since the cutting waste 17 can be removed in any direction, the cutting waste 17 can be reliably removed by changing the air blowing directions of the upper nozzle and the lower nozzle based on the size and the shape of the cutting waste.

It should be noted that, in a case of the configuration in which the operator observes the behavior of the cutting waste and adjusts the direction of the tip of the nozzle by the drive device (not shown), a configuration may be adopted in which the teaching, which has been described as the modification example of the first embodiment, is performed by using the information of the adjustment of the direction of the tip of the nozzle. For example, the screen as shown in FIG. 11 is displayed on the touch panel display 52*i*. On an upper portion of the screen, a pattern simulating a plan view of the sheet for box making 10A is displayed to be overlaid with a pattern of each cutting waste 17 of the gluing flap waste 17*a*, the slot waste 17*b*, or the slit waste 17*c*, and a direction adjustment button (not shown) for adjusting the direction of the tip of the nozzle is displayed corresponding to a lower side of each cutting waste 17. As a result, the corresponding direction of the tip of the upper nozzle can be adjusted with each direction adjustment button. The operator observes the behavior of the cutting waste, adjusts the direction of the tip of the upper nozzle with the direction adjustment button, and touches the save button 85 in a case in which the cutting waste can be removed with the desired behavior.

As a result, when a similar order arrives next time, the control device 52 automatically calls the direction of the tip of the upper nozzle, which is the stored setting value, and controls the air injection based on the setting value. In this case, the direction of the tip of the nozzle, that is, the air blowing direction is the injection mode of the air, and the control device 52 controls the air blowing device 51 in the injection mode of the air stored in the storage unit 52*b*.

In this way, by performing the teaching regarding the injection mode, the injection mode can be automatically and appropriately controlled thereafter under the same condition.

Fifth Embodiment

A fifth embodiment will be described, which has a configuration in which a plurality of upper nozzles 55A and 55B are arranged along the traveling direction of the corrugated cardboard sheet in addition to the first to third embodiments described above regarding the air blow nozzle 55. The configuration of the present embodiment can be applied to any of the first to third embodiments described above.

Here, an example will be described in which the plurality of upper nozzles 55A and the plurality of upper nozzles 55B are arranged along the traveling direction of the corrugated cardboard sheet.

Figure 19:
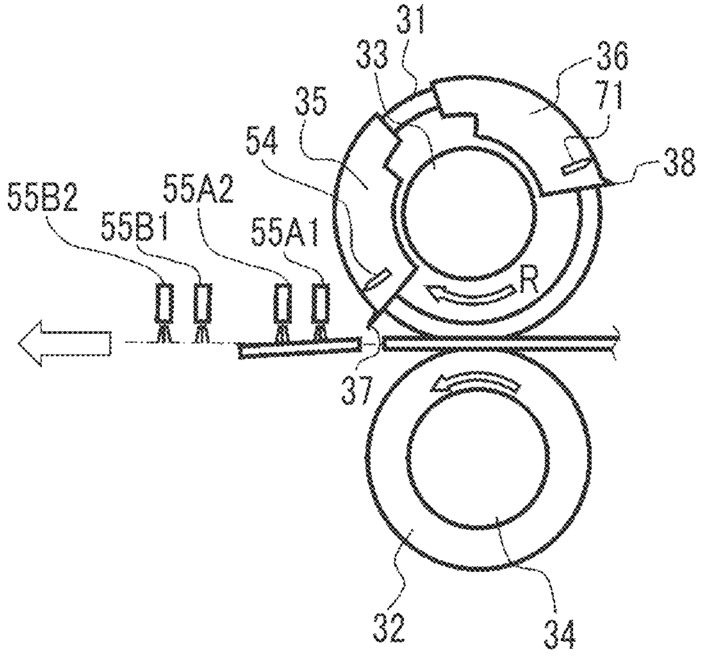
FIG. 19 is a main section side view for describing a cutting waste removing device according to a fifth embodiment.

As shown in FIG. 19, for example, two upper nozzles 55A and two upper nozzles 55B are arranged along the traveling direction of the corrugated cardboard sheet. That is, the first upper nozzle 55A includes an upstream first upper nozzle 55A1 and a downstream first upper nozzle 55A2, and the second upper nozzle 55B includes an upstream second upper nozzle 55B1 and a downstream second upper nozzle 55B2. It should be noted that FIG. 19 shows an example applied to the slotter device according to the first embodiment.

In such an arrangement, the following injection modes can be applied depending on the size of the cutting waste 17 or the behavior in a case in which the cutting waste 17 is separated from the corrugated cardboard sheet 10.

For example, in a case of the upstream first upper nozzle 55A1 and the downstream first upper nozzle 55A2, the upstream first upper nozzle 55A1 and the downstream first upper nozzle 55A2 continuously and simultaneously perform the injection. This injection mode is effective for blowing off the cutting waste 17 horizontally in a case in which the size of the cutting waste 17 is large.

Similarly, in a case of the upstream first upper nozzle 55A1 and the downstream first upper nozzle 55A2, the upstream first upper nozzle 55A1 and the downstream first upper nozzle 55A2 simultaneously inject the air by the pulse injection. This injection mode is also effective for blowing off the cutting waste 17 horizontally in a case in which the size of the cutting waste 17 is large.

In addition, the upstream first upper nozzle 55A1 performs the continuous injection, and the downstream first upper nozzle 55A2 performs the continuous injection with a slight time delay (that is, the blowing is started at different timings). This injection mode is effective for blowing off the cutting waste 17 first from the tip in the transfer direction in a case in which the cutting waste 17 is separated from the corrugated cardboard sheet 10.

Similarly, the upstream first upper nozzle 55A1 injects the air by the pulse injection, and the downstream first upper nozzle 55A2 performs the pulse injection with a slight time delay (that is, the blowing is started at different timings). This injection mode is also effective for blowing off the cutting waste 17 first from the tip in the transfer direction in a case in which the cutting waste 17 is separated from the corrugated cardboard sheet 10.

In addition, the upstream first upper nozzle 55A1 and the downstream first upper nozzle 55A2 perform the injection with the air pressure. This injection mode is effective for blowing off the cutting waste horizontally in a case in which the cutting waste 17 is separated from the corrugated cardboard sheet 10.

In addition, the upstream first upper nozzle 55A1 and the downstream first upper nozzle 55A2 perform the injection with different air pressures. For example, the air pressure of the upstream first upper nozzle 55A1 is higher than the air pressure of the downstream first upper nozzle 55A2. This injection mode is also effective for blowing off the cutting waste 17 horizontally in a case in which the cutting waste 17 is separated from the corrugated cardboard sheet 10.

The injection mode described above can also be applied to the second upper nozzle 55B.

According to the present embodiment, the cutting waste 17 can be reliably removed by selectively using the plurality of arranged nozzles based on the size and the shape of the cutting waste 17.

It should be noted that, in the present embodiment as well, the injection mode may be stored in the storage unit 52*b* by the teaching, which has been described as the modification example of the first embodiment, and the control device 52 may control the air blowing device 51 in the air injection mode stored in the storage unit 52*b*.

In this way, by performing the teaching regarding the injection mode, the injection mode can be automatically and appropriately controlled thereafter under the same condition.

It is also possible to combine the configuration of the fourth embodiment and the configuration of the fifth embodiment. For example, the air blowing directions of the plurality of arranged upper nozzles may be different from each other.

For example, in the configuration shown in FIG. 19, the upper nozzle 55A1 blows the air vertically downward, and the upper nozzle 55A2 blows the air vertically downward and toward the downstream side. In a case in which the cutting waste is long in the traveling direction of the corrugated cardboard sheet, the cutting waste is removed vertically downward by applying the air to both the upstream side and the downstream side of the cutting waste in this way.

In addition, for example, the upper nozzle 55A1 blows the air vertically downward, and the upper nozzle 55A2 blows the air vertically downward and toward the outer side in the device width direction. In this case, the cutting waste is cut while being pushed vertically downward on a tip side in the traveling direction of the corrugated cardboard sheet, and after the cutting is completed, the cutting waste is removed to the outer side in the device width direction.

By causing the air blowing directions of the plurality of upper nozzles to be arranged to be different from each other in this manner, it is possible to reliably remove the cutting waste in any direction.

It should be noted that, even in a case in which the configuration of the fourth embodiment and the configuration of the fifth embodiment are combined, the injection mode may be stored in the storage unit 52*b* by the teaching, which has been described as the modification example of the first embodiment, and the control device 52 may control the air blowing device 51 in the air injection mode stored in the storage unit 52*b*.

In this way, by performing the teaching regarding the injection mode, the injection mode can be automatically and appropriately controlled thereafter under the same condition.

[Others]

Although the embodiments have been described above, the present invention may be implemented by appropriately changing or appropriately combining the embodiments described above without departing from the gist of the present invention.

In the embodiments described above, the first upper nozzle is arranged immediately downstream of all the knives, the lower nozzle is arranged downstream and below each first upper nozzle, and the second upper nozzle is arranged on the most downstream portion. However, the first upper nozzle, the second upper nozzle, and the lower nozzle may be arranged only at key points.

In addition, the control by the teaching, which has been described as the modification example of the first embodiment, may be applied to the second and third embodiments.

In addition, the number of the first upper nozzles and the number of the second upper nozzle described as an example in the embodiments described above are not limited even in the device width direction of each arrangement location. For example, in the first slotter device that cuts the removal portion 15*a* on the front side of the gluing flap portion 15 in the transfer direction TD and cuts the removal portion 15*b* on the rear side of the gluing flap portion 15 in the transfer direction TD at one edge portion of the sheet 10 in order to form the gluing flap portion 15 (including the over flap 16), a nozzle for blowing off the gluing flap waste 17*a* generated in a case in which the removal portion 15*a* and the removal portion 15*b* are cut, and a nozzle for blowing off the slot waste 17*b* generated in a case in which the removal portion 15*a* and the removal portion 15*b* are cut may be respectively arranged, and individually controlled. In this case, the nozzle that blows off the slot waste 17*b* performs the same control as the control of the second slotter device according to the embodiments described above.

ADDITIONAL NOTES

The following additional notes will be further disclosed with respect to the embodiments described above.

Additional Note 1

A cutting waste removing device that is provided in a box making machine which manufactures a corrugated cardboard box from a corrugated cardboard sheet, and that removes a cutting waste generated in cutting processing by a slotter creaser section of the box making machine, the cutting waste removing device including an air blowing device that is arranged along a traveling area in a device width direction in which a cutting processed portion of the corrugated cardboard sheet and the cutting waste travel, and that injects air toward the cutting waste in a predetermined injection mode such that a directional component to a vertically downward side is included, and a control device that performs intermittent on/off control of an operation of the air blowing device, in which the control device controls the air blowing device to be turned on only at a timing at which the cutting waste passes through an air injection region of the air blowing device.

Additional Note 2

The cutting waste removing device according to Additional Note 1, in which the control device acquires traveling timing information of the corrugated cardboard sheet, and turns on the air blowing device in the injection mode based on the traveling timing information.

Additional Note 3

The cutting waste removing device according to Additional Note 1 or 2, in which the control device acquires order information of the corrugated cardboard box, and turns on the air blowing device in the injection mode based on the order information.

Additional Note 4

The cutting waste removing device according to Additional Note 2 or 3, in which the control device performs air injection in a pulse-like manner as the injection mode during an on-control period in which the air blowing device is turned on.

Additional Note 5

The cutting waste removing device according to Additional Note 4, in which a first mode in which the air injection is continuously performed during the on-control period and a second mode in which the air injection is performed in a pulse-like manner during the on-control period are provided, and the control device performs the air injection by selecting the injection mode of any one of the first mode and the second mode based on order information of the corrugated cardboard box.

Additional Note 6

The cutting waste removing device according to any one of Additional Notes 1 to 5, in which the air blowing device includes a compressed air supply source, air blow nozzle, and a flow rate adjusting device that includes an open/shut valve interposed between air supply passages connecting the compressed air supply source and the air blow nozzle, the control device performs intermittent on/off control of the open/shut valve, the flow rate adjusting device includes a pressure adjusting valve for adjusting strength of compressed air, and the control device adjusts the strength of the compressed air by controlling the pressure adjusting valve based on order information of the corrugated cardboard box.

Additional Note 7

The cutting waste removing device according to Additional Note 6, in which the air blow nozzle includes an upper nozzle that is arranged above the traveling area, and that has an air blowing direction set toward the traveling area.

Additional Note 8

The cutting waste removing device according to Additional Note 7, in which the upper nozzle includes a first upper nozzle that is arranged on an immediately downstream side of a slotter knife of the slotter device.

Additional Note 9

The cutting removing device according to Additional Note 7 or 8, in which the upper nozzle includes a second upper nozzle that is arranged on a downstream side of the slotter device.

Additional Note 10

The cutting waste removing device according to any one of Additional Note 7 to 9, in which the air blowing direction of the upper nozzle as the injection mode includes a directional component to an outer side in the device width direction.

Additional Note 11

The cutting waste removing device according to any one of Additional Note 7 to 10, in which the air blowing direction of the upper nozzle as the injection mode includes a directional component to an upstream side in a traveling direction of the corrugated cardboard sheet.

Additional Note 12

The cutting waste removing device according to any one of Additional Notes 7 to 11, in which a plurality of the upper nozzles are arranged along a traveling direction of the corrugated cardboard sheet.

Additional Note 13

The cutting waste removing device according to any one of Additional Notes 7 to 12, in which the upper nozzle includes a nozzle for a gluing flap portion that is arranged above a traveling area of a gluing flap portion processed on one edge portion of the corrugated cardboard sheet in the device width direction.

Additional Note 14

The cutting waste removing device according to any one of Additional Notes 7 to 13, in which the upper nozzle includes a nozzle for an edge portion that is arranged above a traveling area of an edge portion in which the other edge portion of the corrugated cardboard sheet in the device width direction is subjected to the cutting processing.

Additional Note 15

The cutting waste removing device according to any one of Additional Notes 7 to 14, in which the upper nozzle includes a nozzle for a groove that is arranged above a traveling area in which a groove of the corrugated cardboard sheet is subjected to the cutting processing.

Additional Note 16

The cutting waste removing device according to any one of Additional Notes 7 to 15, in which a discard space for discarding the cutting waste is provided below the traveling area on a downstream side of the slotter device, and the air blow nozzle includes a lower nozzle that guides the cutting waste, which is blown off downward from the traveling area by the upper nozzle to the discard space.

Additional Note 17

The cutting waste removing device according to any one of Additional Notes 6 to 16, in which the air blowing device includes a nozzle direction change mechanism that changes an air blowing direction of the air blow nozzle as the injection mode.

Additional Note 18

The cutting waste removing device according to any one of Additional Notes 1 to 17, in which the control device includes a storage unit that stores the injection mode of the air designated by teaching, and controls the air blowing device in the injection mode of the air stored in the storage unit.

Additional Note 19

A slotter device that is provided in a box making machine which manufactures a corrugated cardboard box from a corrugated cardboard sheet, the slotter device including the cutting waste removing device according to any one of Additional Notes 1 to 18 on a downstream side of a slotter knife of the slotter device.

Additional Note 20

A box making machine that is equipped with a slotter device, and that manufactures a corrugated cardboard box from a corrugated cardboard sheet, the box making machine including the cutting waste removing device according to any one of Additional Notes 1 to 18 on a downstream side of the slotter device.

REFERENCE SIGNS LIST

1: feeding section
2: printing section
3: slotter creaser section
4: die cutting section
5: folding section
6: counter-ejector section
10: corrugated cardboard sheet (sheet)
10A: sheet for box making
10B: corrugated cardboard box
11, 12: slot
15: gluing flap portion
15*a*, 15*b*: removal portion
16: over flap
17: cutting waste
17*a*, 17*d*: gluing flap waste (cutting waste)
17*b*, 17*e*: slot waste (cutting waste)
17*c*: slit waste (cutting waste)
30, 130, 230: slotter device
130U, 230U: upstream slotter device
130D, 230D: downstream slotter device
230M: intermediate slotter device
30A: first slotter device
30B: second slotter device
31, 131U, 131D, 231U, 231M, 231D: upper slotter head
32, 132U, 132D, 232U, 232M, 232D: lower slotter head
35, 36, 135, 136, 235, 236, 239A to 239D: slotter knife
39: slitter device
41, 42, 51, 52: transfer roller
50: cutting waste removing device
51: air blow device (air blowing device)
52: control device
53: air supply source
53A: compressor
53B: air tank
54: flow rate adjusting device
54A: pressure reducing valve
54B: open/shut valve
55: air blow nozzle
55A: first upper nozzle (upper nozzle)
55B: second upper nozzle (upper nozzle)
55C: lower nozzle
56: air pipe
60: creaser device
A: traveling area of sheet 10
S: discard space
TD: transfer direction

The invention claimed is:

1. A cutting waste removing device that is provided in a box making machine which manufactures a corrugated cardboard box from a corrugated cardboard sheet, and that removes a cutting waste generated in cutting processing by a slotter creaser section of the box making machine, the cutting waste removing device comprising:

an air blowing device that is arranged along a traveling area in a device width direction in which a cutting processed portion of the corrugated cardboard sheet and the cutting waste travel, and that injects air toward the cutting waste in a predetermined injection mode such that a directional component to a vertically downward side is included; and a control device that performs intermittent on/off control of an operation of the air blowing device, wherein the control device controls the air blowing device to be turned on only at a timing at which the cutting waste passes through an air injection region of the air blowing device.

2. The cutting waste removing device according to claim 1, wherein the control device acquires traveling timing information of the corrugated cardboard sheet, and turns on the air blowing device in the injection mode based on the traveling timing information.

3. The cutting waste removing device according to claim 1, wherein the control device acquires order information of the corrugated cardboard box, and turns on the air blowing device in the injection mode based on the order information.

4. The cutting waste removing device according to claim 1, wherein the air blowing device includes a compressed air supply source, an air blow nozzle, and a flow rate adjusting device that includes an open/shut valve interposed between air supply passages connecting the compressed air supply source and the air blow nozzle, the control device performs intermittent on/off control of the open/shut valve, the flow rate adjusting device includes a pressure adjusting valve for adjusting strength of compressed air, and the control device adjusts the strength of the compressed air by controlling the pressure adjusting valve based on order information of the corrugated cardboard box.

5. The cutting waste removing device according to claim 4, wherein the air blow nozzle includes an upper nozzle that is arranged above the traveling area, and that has an air blowing direction set toward the traveling area.

6. The cutting waste removing device according to claim 5, wherein a plurality of the upper nozzles are arranged along a traveling direction of the corrugated cardboard sheet.

7. The cutting waste removing device according to claim 5, wherein the upper nozzle includes a nozzle for a gluing flap portion that is arranged above a traveling area of a gluing flap portion processed on one edge portion of the corrugated cardboard sheet in the device width direction.

8. The cutting waste removing device according to claim 6, wherein the upper nozzle includes a nozzle for a gluing flap portion that is arranged above a traveling area of a gluing flap portion processed on one edge portion of the corrugated cardboard sheet in the device width direction.

9. The cutting waste removing device according to claim 5, wherein the upper nozzle includes a nozzle for an edge portion that is arranged above a traveling area of an edge portion in which the other edge portion of the corrugated cardboard sheet in the device width direction is subjected to the cutting processing.

10. The cutting waste removing device according to claim 6, wherein the upper nozzle includes a nozzle for an edge portion that is arranged above a traveling area of an edge portion in which the other edge portion of the corrugated cardboard sheet in the device width direction is subjected to the cutting processing.

11. The cutting waste removing device according to claim 5, wherein the upper nozzle includes a nozzle for a groove that is arranged above a traveling area in which a groove of the corrugated cardboard sheet is subjected to the cutting processing.

12. The cutting waste removing device according to claim 6, wherein the upper nozzle includes a nozzle for a groove that is arranged above a traveling area in which a groove of the corrugated cardboard sheet is subjected to the cutting processing.

13. The cutting waste removing device according to claim 5, wherein a discard space for discarding the cutting waste is provided below the traveling area on a downstream side of the slotter device, and the air blow nozzle includes a lower nozzle that guides the cutting waste, which is blown off downward from the traveling area by the upper nozzle to the discard space.

14. The cutting waste removing device according to claim 6, wherein a discard space for discarding the cutting waste is provided below the traveling area on a downstream side of the slotter device, and the air blow nozzle includes a lower nozzle that guides the cutting waste, which is blown off downward from the traveling area by the upper nozzle to the discard space.

15. The cutting waste removing device according to claim 4, wherein the air blowing device includes a nozzle direction change mechanism that changes an air blowing direction of the air blow nozzle as the injection mode.

16. The cutting waste removing device according to claim 5, wherein the air blowing device includes a nozzle direction change mechanism that changes an air blowing direction of the air blow nozzle as the injection mode.

17. The cutting waste removing device according to claim 6, wherein the air blowing device includes a nozzle direction change mechanism that changes an air blowing direction of the air blow nozzle as the injection mode.

18. The cutting waste removing device according to claim 1, wherein the control device includes a storage unit that stores the injection mode of the air designated by teaching, and controls the air blowing device in the injection mode of the air stored in the storage unit.

19. A slotter device that is provided in a box making machine which manufactures a corrugated cardboard box from a corrugated cardboard sheet, the slotter device comprising:

the cutting waste removing device according to claim 15 on a downstream side of a slotter knife of the slotter device.

20. A box making machine that is equipped with a slotter device, and that manufactures a corrugated cardboard box from a corrugated cardboard sheet, the box making machine comprising:

the cuttting waste removing device according to claim 15 on a downstream side of the slotter device.

* * * * *